(12) United States Patent
Takemori et al.

(10) Patent No.: US 10,931,459 B2
(45) Date of Patent: *Feb. 23, 2021

(54) ONBOARD COMPUTER SYSTEM, VEHICLE, MANAGEMENT METHOD, AND COMPUTER PROGRAM

(71) Applicant: KDDI CORPORATION, Tokyo (JP)

(72) Inventors: Keisuke Takemori, Tokyo (JP); Hideaki Kawabata, Tokyo (JP)

(73) Assignee: KDDI Corporation, Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 16/064,232

(22) PCT Filed: Dec. 26, 2016

(86) PCT No.: PCT/JP2016/088701
§ 371 (c)(1),
(2) Date: Jun. 20, 2018

(87) PCT Pub. No.: WO2017/115751
PCT Pub. Date: Jul. 6, 2017

(65) Prior Publication Data
US 2019/0007217 A1    Jan. 3, 2019

(30) Foreign Application Priority Data

Dec. 28, 2015    (JP) .............................. JP2015-256649

(51) Int. Cl.
*H04L 9/32* (2006.01)
*B60R 16/02* (2006.01)
(Continued)

(52) U.S. Cl.
CPC ............ *H04L 9/3247* (2013.01); *B60R 16/02* (2013.01); *G06F 21/64* (2013.01); *H04L 9/08* (2013.01);
(Continued)

(58) Field of Classification Search
CPC .......... H04W 4/40; B60R 16/02; G06F 21/64; H04L 9/08
(Continued)

(56) References Cited

U.S. PATENT DOCUMENTS 9,231,936 B1 * 1/2016 Wang ...................... H04L 63/08
2001/0002814 A1 * 6/2001 Suganuma ............ G06F 21/313
340/5.74

(Continued)

FOREIGN PATENT DOCUMENTS

CN    101729979 A    6/2010
JP    2005-203882 A    7/2005
(Continued)

OTHER PUBLICATIONS

Samuel Woo; A Practical Wireless Attack on the Connected Car and Security Protocol for In-Vehicle CAN; IEEE: Apr. 2015; p. 993-1005.*

(Continued)

*Primary Examiner* — Monjur Rahim
(74) *Attorney, Agent, or Firm* — Greenblum & Bernstein, P.L.C.

(57) ABSTRACT

An onboard computer system includes a first onboard computer configured to store a first public key certificate of a data delivering apparatus, a second onboard computer, and a secure element configured to store a second public key certificate relative to a second secret key used to generate the first public key certificate. The secure element verifies the first public key certificate by use of the second public key certificate. The first onboard computer includes an encryption processor configured to verify a first electronic signature attached to data delivered from the data delivering apparatus by use of the first public key certificate which is successfully verified by the secure element. The data (Continued)

attached with the first electronic signature, which is successfully verified by the encryption processor, is applied to the first onboard computer or the second onboard computer.

16 Claims, 12 Drawing Sheets

(51) Int. Cl.
    *G06F 21/64*     (2013.01)
    *H04L 9/08*     (2006.01)
    *H04W 4/40*     (2018.01)

(52) U.S. Cl.
    CPC .......... *H04L 9/0825* (2013.01); *H04L 9/0877* (2013.01); *H04L 9/0897* (2013.01); *H04L 9/32* (2013.01); *H04W 4/40* (2018.02)

(58) Field of Classification Search
    USPC ........................................................ 713/171
    See application file for complete search history.

(56) References Cited

U.S. PATENT DOCUMENTS

| | | | |
|---|---|---|---|
| 2004/0003252 A1* | 1/2004 | Dabbish | H04L 9/3263 713/175 |
| 2005/0176407 A1 | 8/2005 | Tuomi et al. | |
| 2006/0115085 A1* | 6/2006 | Iwamura | H04L 9/0822 380/259 |
| 2006/0255910 A1 | 11/2006 | Fukishima et al. | |
| 2011/0320089 A1* | 12/2011 | Lewis | H04W 12/04 701/29.6 |
| 2013/0067220 A1* | 3/2013 | Ando | H04L 67/12 713/156 |
| 2013/0173112 A1* | 7/2013 | Takahashi | H04W 12/003 701/36 |
| 2013/0230173 A1* | 9/2013 | Hori | H04L 9/0891 380/281 |
| 2015/0086016 A1* | 3/2015 | Oshida | H04L 9/0822 380/255 |
| 2015/0334554 A1* | 11/2015 | Song | H04W 12/06 455/558 |
| 2016/0072781 A1* | 3/2016 | Zhang | H04L 63/065 726/4 |
| 2016/0173530 A1 | 6/2016 | Miyake | |
| 2016/0373449 A1* | 12/2016 | Haga | H04W 4/46 |
| 2016/0378457 A1* | 12/2016 | Adachi | H04L 63/123 713/181 |
| 2017/0324558 A1* | 11/2017 | Takemori | H04L 9/0891 |
| 2019/0263336 A1* | 8/2019 | Haga | G08G 1/162 |

FOREIGN PATENT DOCUMENTS

| | | |
|---|---|---|
| JP | 2005-341528 A | 12/2005 |
| JP | 2013-138304 A | 7/2013 |
| JP | 2013-138320 A | 7/2013 |
| JP | 2013-234521 A | 11/2013 |
| JP | 2014-053675 A | 3/2014 |
| JP | 2015-65495 A | 4/2015 |
| JP | 2015-076018 A | 4/2015 |
| JP | 2016-072675 A | 5/2016 |
| JP | 2016-116216 A | 6/2016 |
| WO | 2015/080108 A1 | 6/2015 |

OTHER PUBLICATIONS

Takemori, "In-Vehicle Network Security Using Secure Elements—Discussion of Security Technologies—", IEICE, IEICE Technical Report, Mar. 2015, pp. 77-78, vol. 114, No. 508.
Takemori et al., "Key Managements for ECU and Code Authentications Using Tamper-resistant Secure Element", IEICE Technical Report, Dec. 10, 2015, pp. 227-232, vol. 115, No. 365.
Takemori, "Automotive Security—Using Secure Element—", http://www.ieee-jp.org/section/tokyo/chapter/ITS-38/pdf/20151107icves2015keynote3.pdf, Dec. 16, 2015, pp. 1-27.
International Search Report issued in WIPO Patent Application No. PCT/JP2016/088701, dated Apr. 4, 2017.
Search Report issued in European Patent Office (EPO) Patent Application No. 16881726.0 dated Jul. 10, 2019.
Search Report issued in European Patent Office (EPO) Patent Application No. 1688172.6, dated Jul. 10, 2019.
Takemori et al., "Protection for Automotive Control System Using Secure Boot and Authentication", IEICE Technical Report, Sep. 12, 2014, pp. 47-54, vol. 114, No. 225.
Miller et al., "Adventures in Automotive Networks and Control Units", Def Con 21, Aug. 2013.
Takemori, "Secure Boot for Android+TPM", Nikkei Electronics, Aug. 6, 2012, together with a partial English-language translation.
Takada et al., "Suggestion for Intensifying Information Security for Vehicle-Embedded System", Sep. 2013, together with an English-language translation.
Takemori et al., "Secure Boot for Android(ARM)+TPM", the Institute of Electronics, Information and Communication Engineers, SCIS2013 Symposium, Jan. 2013, together with a partial English-language translation.
Takemori et al., "Secure Boot for ARM+SIM/UIM", the Institute of Electronics, Information and Communication Engineers, SCIS2014 Symposim, Jan. 2014, together with a partial English-language translation.
"Trusted Computing Group, Internet website URL: http://www.trustedcomputinggroup.org", printed on Mar. 22, 2017.
C. Schleiffer et al., "Secure Key Management—A Key Feature for Modern Vehicle Electronics", SAE Technical Paper, SAE International, Apr. 8, 2013, 2013-01-1418.
Search Report issued in International Bureau of WIPO Patent Application No. PCT/JP2015/084909, dated Mar. 15, 2016.
Office Action issued in Japan family member patent Appl. No. 2015-232348, dated Apr. 4, 2017, along with an English translation thereof.
Office Action issued in Japanese family member Patent Appl. No. 2017-130661, dated Jun. 5, 2018, along with an English translation thereof.
Search Report issued in European Patent Office (EPO) Patent Application No. 15867958.9, dated Jun. 11, 2018.
USPTO Non-Final Office Action, dated Jan. 8, 2019, in U.S. Appl. No. 15/533,751.
USPTO Notice of Allowance and Fee(s) Due, dated Jun. 12, 2009, in U.S. Appl. No. 15/533,751.
The First Office Action (including English language translation), dated Jul. 27, 2020 by the China National Intellectual Property Administration, in Chinese Application No. 201680076510.4.

* cited by examiner

ONBOARD COMPUTER SYSTEM, VEHICLE, MANAGEMENT METHOD, AND COMPUTER PROGRAM

TECHNICAL FIELD

The present invention relates to an onboard computer system, a vehicle, a management method, and a computer program.

The present application claims the benefit of priority on Japanese Patent Application No. 2015-256649 filed on Dec. 28, 2015, the subject matter of which is hereby incorporated herein by reference.

BACKGROUND ART

Conventionally, automobiles are equipped with ECUs (Electronic Control Units) to achieve engine control functions using ECUs. The ECU is one type of computer configured to achieve desired functions according to computer programs. For example, Non-Patent Literature Document 1 discloses a security technology for an in-vehicle control system including multiple ECUs connected together via a CAN (Controller Area Network).

In addition, automobiles are equipped with diagnosis ports called OBD (On-board Diagnostics) ports connectible to ECUs. When a diagnosis terminal exclusively used for maintenance is connected to an OBD port, it is possible to install updated programs in ECUs and to change settings of data with ECUs by means of the diagnosis terminal. When updating of computer programs for ECUs installed in already-used automobiles, computer programs may be normally updated by workers of official dealers or automobile repair shops for vehicle inspection or periodical inspection of automobiles.

CITATION LIST

Non-Patent Literature Document

Non-Patent Literature Document 1: Keisuke Takeuchi, "Protection of In-vehicle Control System Based on Secure Elements—Organization and Study of Elemental Technology—", The Institute of Electronics, Information and Communication Engineers, Shingaku-Giho, Vol, 114, No. 508, pp. 73-78, March 2015

SUMMARY OF INVENTION

Technical Problem

It has been discussed that data of updated programs applied to ECUs for onboard computer systems in automobiles would be delivered to automobiles through communication lines. In this case, it is possible to carry out a procedure to guarantee the correctness of delivered data such that an electronic signature attached to delivered data is verified using a public key certificate in an automobile. However, it is necessary to consider the possibility of verifying an electronic signature using an unauthorized public key certificate.

The present invention is made in consideration of the aforementioned circumstances, and therefore the present invention aims to provide an onboard computer system, a vehicle, a management method, and a computer program, which can improve the reliability of verifying the correctness of data applied to onboard computers such as ECUs.

Solution to Problem (1) An onboard computer system according to one aspect of the present invention, which is an onboard computer system installed in a vehicle, includes a first onboard computer configured to store a first public key certificate representing a public key certificate of a data delivering apparatus, a second onboard computer, and a first secure element configured to store a second public key certificate relative to a second secret key used for generating the first public key certificate. The first onboard computer and the second onboard computer are connected to a communication network installed in the vehicle. The first secure element verifies the first public key certificate by use of the second public key certificate, wherein the first onboard computer comprises an encryption processor configured to verify a first electronic signature attached to first data, which is received from the data delivering apparatus, by use of the first public key certificate which is successfully verified by the first secure element. The first data attached with the first electronic signature, which is successfully verified by the encryption processor, is applied to the first onboard computer or the second onboard computer.

(2) In an onboard computer system according to one aspect of the present invention, i.e. the aforementioned onboard computer system of (1), the first secure element stores a third secret key and thereby generates a third electronic signature for application result information representing an applied result of the first data by use of the third secret key, wherein the onboard computer system transmits the application result information attached with the third electronic signature to the data delivering apparatus.

(3) In an onboard computer system according to one aspect of the present invention, i.e. the aforementioned onboard computer system of (2), wherein the first secure element stores a second secret key and thereby generates a third public key certificate relative to the third secret key by use of the second secret key, whereby the onboard computer system transmits the third public key certificate to the data delivering apparatus.

(4) An onboard computer system according to one aspect of the present invention, i.e. the aforementioned onboard computer system of (1), further includes a second secure element configured to store a third secret key. The second secure element generates a third electronic signature attached to application result information representing an applied result of the first data by use of the third secret key, whereby the onboard computer system transmits the application result information attached with the third electronic signature to the data delivering apparatus.

(5) In an onboard computer system according to one aspect of the present invention, i.e. the aforementioned onboard computer system of (4), the second secure element stores a second secret key and thereby generates a third public key certificate by use of the second secret key, whereby the onboard computer system, transmits the third public key certificate to the data delivering apparatus.

(6) In an onboard computer system according to one aspect of the present invention, i.e. the aforementioned onboard computer system according to any one of (1) through (5), the first secure element is installed in a communication module mounted on the vehicle.

(7) In an onboard computer system according to one aspect of the present invention, i.e. the onboard computer system according to any one of (1) through (5), the first secure element is installed in the first onboard computer.

(8) In an onboard computer system according to one aspect of the present invention, i.e. the onboard computer system according to (4) or (5), the second secure element is installed in the first onboard computer.

(9) In an onboard computer system according to one aspect of the present invention, i.e. the onboard computer system according to (4) or (5), the second secure element is installed in a communication module mounted on the vehicle.

(10) In an onboard computer system according to one aspect of the present invention, i.e. the onboard computer system according to any one of (1) through (9), the first onboard computer sends the first data attached with the first electronic signature, which is successfully verified by the encryption processor, to the second onboard computer; the second onboard computer receives and applies the first data from the first onboard computer; the first onboard computer and the second onboard computer store a same common key and thereby verify a validity of applying the first data by use of the common key.

(11) An onboard computer system according to one aspect of the present invention, i.e. an onboard computer system installed in a vehicle, includes a first onboard computer configured to store a first public key certificate representing a public key certificate of a data delivering apparatus, and a second onboard computer. The first onboard computer and the second onboard computer are connected to a communication network installed in the vehicle. The first public key certificate is successfully verified by a secure element, which is installed in a device outside the vehicle so as to receive or transmit data with the first onboard computer, by use of a second public key certificate, which is stored on the secure element and relative to a second secret key used to generate the first public key certificate. The first onboard computer includes an encryption processor configured to verify a first electronic signature attached to first data received from the data delivering apparatus by use of the first public key certificate. The first data attached with the first electronic signature, which is successfully verified by the encryption processor, is applied to the first onboard computer or the second onboard computer.

(12) A vehicle according to one aspect of the present invention includes the aforementioned onboard computer system according to any one of (1) through (11).

(13) In a management method according to one aspect of the present invention, an onboard computer system installed in a vehicle includes a first onboard computer configured to store a first public key certificate representing a public key certificate of a data delivering apparatus, a second onboard computer, and a secure element configured to store a second public key certificate relative to a second secret key used to generate the first public key certificate, wherein the first onboard computer and the second onboard computer are connected to a communication network installed in a vehicle. The management method implements a public key certificate verifying step in which the secure element verifies the first public key certificate by use of the second public key certificate; an electronic signature verifying step in which the first onboard computer verifies a first electronic signature attached to first data received from the data deliver by use of the first public key certificate which is successfully verified by the secure element; and a data applying step for applying the first data, which is attached with the first electronic signature successfully verified in the electronic signature verifying step, to the first onboard computer or the second onboard computer.

(14) In an management method according to one aspect of the present invention, an onboard computer system installed in a vehicle includes a first onboard computer configured to store a first public key certificate representing a public key certificate of a data delivering apparatus, and a second onboard computer, wherein the first onboard computer and the second onboard computer are connected to a communication network installed in a vehicle, and wherein first public key certificate is successfully verified by a secure element installed in a device, which is installed in a device outside the vehicle so as to receive or transmit data with the first onboard computer, by use of a second public key certificate, which is stored on the secure element and relative to a second secret key used to generate the first public key certificate. The management method implements an electronic signature verifying step that the first onboard computer verifies a first electronic signature attached to first data received from the data delivering apparatus by use of the first public key certificate; and a data applying step for applying the first data attached with the first electronic signature, which is successfully verified in the electronic signature verifying step, to the first onboard computer or the second onboard computer.

(15) In a computer program according to one aspect of the present invention, an onboard computer system installed in a vehicle includes a first onboard computer configured to store a first public key certificate representing a public key certificate of a data delivering apparatus, a second onboard computer, and a secure element configured to store a second public key certificate relative to a second secret key used to generate the first public key certificate, wherein the first onboard computer and the second onboard computer are connected to a communication network installed in a vehicle. The computer program causes a computer of the secure element to implement a public key certificate verifying step for verifying the first public key certificate by use of the second public key certificate. It causes the first onboard computer to implement an electronic signature verifying step for verifying a first electronic signature attached to first data received from the data deliver by use of the first public key certificate which is successfully verified by the secure element. It causes the first onboard computer or the second onboard computer to implement a data applying step for applying the first data which is attached with the first electronic signature successfully verified in the electronic signature verifying step.

(16) In a computer program according to one aspect of the present invention, an onboard computer system installed in a vehicle includes a first onboard computer configured to store a first public key certificate representing a public key certificate of a data delivering apparatus, and a second onboard computer, wherein the first onboard computer and the second onboard computer are connected to a communication network installed in a vehicle, and wherein first pubic key certificate is successfully verified by a secure element installed in a device, which is installed in a device outside the vehicle so as to receive or transmit data with the first onboard computer, by use of a second public key certificate, which is stored on the secure element and relative to a second secret key used to generate the first public key certificate. The computer program causes the first onboard computer to implement an electronic signature verifying step for verifying a first electronic signature attached to first data received from the data delivering apparatus by use of the first public key certificate. It causes the first onboard computer or the second onboard computer to implement a data applying step for applying the first data attached with the first electronic signature which is successfully verified in the electronic signature verifying step.

Advantageous Effects of Invention

According to the present invention, it is possible to obtain an effect of improving the reliability of verifying the correctness of data applied to onboard computers such as ECUs.

DESCRIPTION OF EMBODIMENTS

Hereinafter, the present invention will be described by way of embodiments. In this connection, the following embodiments will be described with respect to automobiles as an example of vehicles.

First Embodiment

Figure 1:
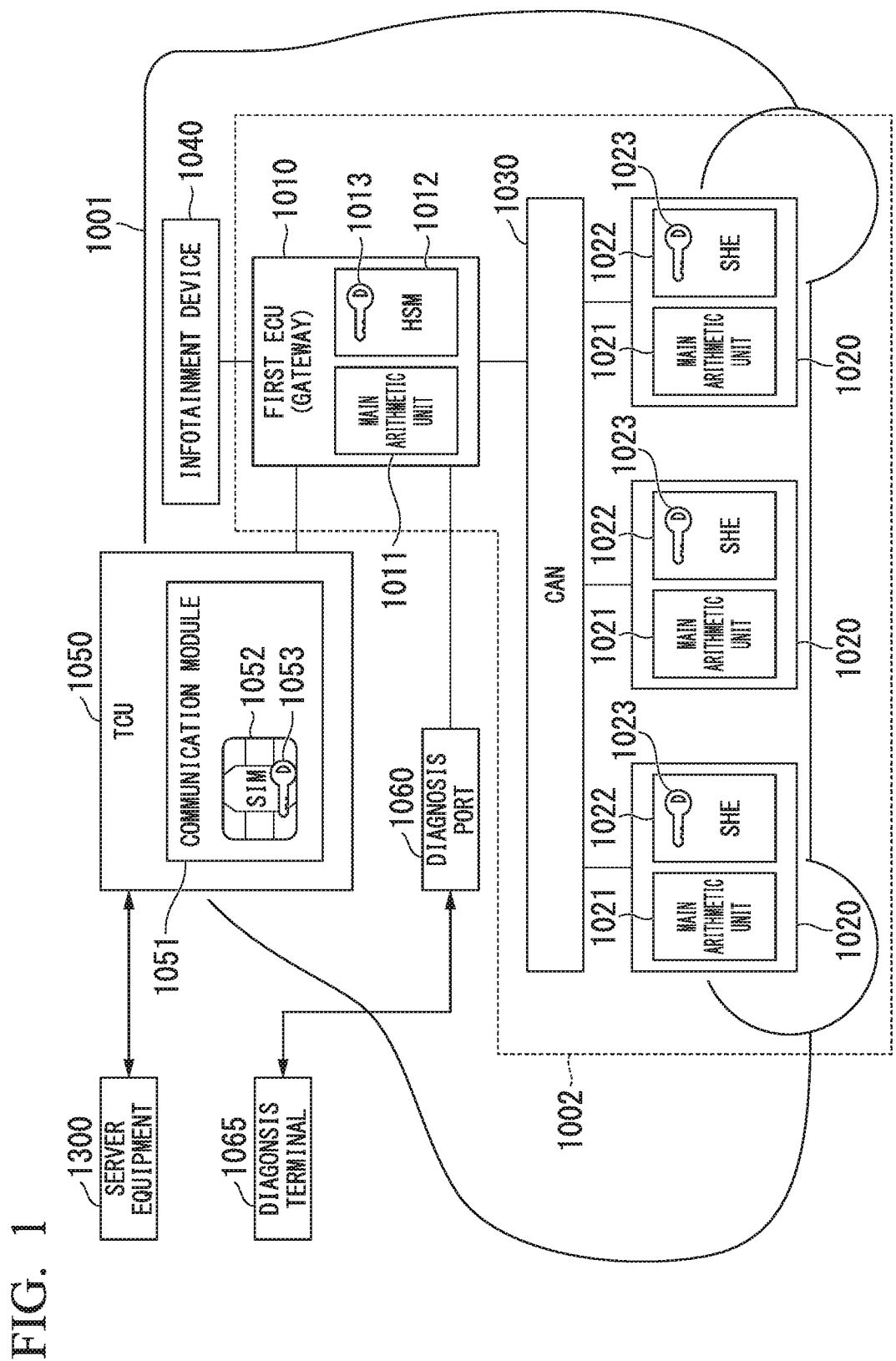
FIG. 1 is a block diagram showing an automobile according to the first embodiment of the present invention.

FIG. 1 is a block diagram showing a configuration example of an automobile 1001 according to the present embodiment. The present embodiment will be described with respect to an example that data of updated programs will be applied to ECUs (electronic control units) mounted on the automobile 1001.

Configuration Example 1 of Automobile

In FIG. 1, the automobile 1001 includes a first ECU 1010 and a plurality of second ECUs 1020. The first ECU 1010 and the second ECUs 1020 are onboard computers mounted on the automobile 1001. The first ECU 1010 is an ECU having a gateway function among ECUs mounted on the automobile 1001. The second ECU 1020 is an ECU having an engine control function among ECUs mounted on the automobile 1001. As the second ECU 1020, for example, it is possible to mention an ECU having an engine control function, an ECU having a handle control function, an ECU having a brake control function, and the like.

The first ECU 1010 and a plurality of second ECUs 1020 are connected to a CAN (Controller Area Network) 1030 installed in the automobile 1001. The CAN 1030 is a communication network. The CAN is known as one type of communication network installed in a vehicle.

The first ECU 1010 exchange data with each of the second ECUs 1020 through the CAN 1030. The second ECU 1020 exchanges data with other second ECUs 1020 through the CAN 1030.

As a communication network installed in each vehicle, it is possible to install another communication network other than CAN in the automobile 1001; hence, it is possible to carry out data exchange between the first ECU 1010 and the second ECU 1020 and data exchange between the second ECUs 1020 through another communication network other than CAN. For example, it is possible to install a LIN (Local Interconnect Network) in the automobile 1001. Alternatively, it is possible to install both the CAN and the LIN in the automobile 1001. In addition, it is possible to mount a second ECU 1020 connected to the LIN on the automobile 1001.

The first ECU 1010 may be connected to both the CAN and the LIN. In addition, the first ECU 1010 may exchange data with the second ECU 1020 connected to the CAN through the CAN, and the first ECU 1010 may exchange data with the second ECU 1020 connected to the LIN through the LIN. Alternatively, it is possible for the second ECUs 1020 to mutually exchange data through the LIN.

The automobile 1001 is equipped with the diagnosis port 1060. As the diagnosis port 1060, for example, it is possible to use an OBD port. The diagnosis port 1060 is connectible to a diagnosis terminal 1065. The diagnosis port 1060 is connected to the first ECU 1010. The first ECU 1010 and the diagnosis terminal 1065 connected to the diagnosis port 1060 can exchange data through the diagnosis port 1060.

The automobile 1001 is equipped with an infotainment device 1040. As the infotainment device 1040, for example, it is possible to mention devices having a navigation function, a position information service function, a multimedia playback function for music and moving pictures, a speech communication function, a data communication function, an Internet connection function, and the like. The infotainment device 1040 is connected to the first ECU 1010. The first ECU 1010 transmits information, which is input from the infotainment device 1040, to the second ECU 1020.

The automobile 1001 is equipped with a TCU (Tele Communication Unit) 1050. The TCU 1050 is a communication device. The TCU 1050 includes a communication module 1051. The communication module 1051 carries out wireless communication through a wireless communication network. The communication module 1051 includes an SIM (Subscriber Identify Module) 1052. The SIM 1052 is an SIM having written information for using a wireless communication network. The communication module 1051 is connected to a wireless communication network using the SIM 1052 so as to carry out wireless communication.

The SIM 1052 includes a key storage media 1053 configured to store keys. As the SIM 1052, it is possible to use an eSIM (embedded Subscriber Identity Module). Both the SIM and the eSIM are tamper resistant. The SIM and the eSIM represent an example of secure elements (SE). Secure elements are tamper resistant. The SIM and the eSIM are one type of computer configured to achieve desired functions according to computer programs.

The TCU 1050 is connected to the first ECU 1010. The first ECU 1010 exchanges data with the communication module 1051 of the TCU 1050.

According to the configuration of FIG. 1, the first ECU 1010 is directly connected to the TCU 1050 so that the first ECU 1010 can exchange data with the communication module 1051; but this is not a restriction. For example, it is possible to connect the TCU 1050 to the infotainment device 1040 so that the first ECU 1010 can exchange data with the communication module 1051 of the TCU 1050 by means of the infotainment device 1040. Alternatively, it is possible to connect the TCU 1050, instead of the diagnosis terminal 1065, to the diagnosis port 1060 so that the first ECU 1010 can exchange data with the communication module 1051 of the TCU 1050, which is connected to the diagnosis port 1060, via the diagnosis port 1060. In addition, the first ECU 1010 may include the communication module 1051 including the SIM 1052. In this case, the automobile 1001 does not necessarily include the TCU 1050 since the first ECU 1010 includes the communication module 1051 including the SIM 1052.

The first ECU 1010 includes a main arithmetic unit 1011 and an HSM (Hardware Security Module) 1012. The main arithmetic unit 1011 executes computer programs to achieve the function of the first ECU 1010. The HSM 1012 has an encryption processing function.

The HSM 1012 is tamper resistant. The HSM 1012 is one example of secure elements. The HSM 1012 includes a key storage media 1013 configured to store keys. The main arithmetic unit 1011 uses the HSM 1012.

The first ECU 1010 includes an encryption processor, which is not necessarily limited to the HSM 1012. As an encryption process installed in the first ECU 1010, for example, it is possible to use an encryption processing chip called "TPMf (Trusted Platform Module)". The TPMf is tamper resistant. The TPMf is one example of secure elements.

The second ECU 1020 includes a main arithmetic unit 1021 and an SHE (Secure Hardware Extension) 1022. The main arithmetic unit 1021 executes computer programs to achieve the function of the second ECU 1020. The SHE 1022 has an encryption processing function. The SHE 1022 is tamper resistant. The SHE 1022 is one example of secure elements. The SHE 1022 includes a key storage media 1023 configured to store keys. The main arithmetic unit 1021 uses the SHE 1022.

An encryption processor installed in the second ECU 1020 is not necessarily limited to the SHE 1022. As an encryption processor installed in the second ECU 1020, for example, it is possible to use an encryption processing chip called "TPMt". The TPMt is tamper resistant. The TPMt is one example of secure elements.

The automobile 1001 includes an onboard computer system 1002, in which the first ECU 1010 is connected to a plurality of second ECUs 1020 through the CAN 1030. The first ECU 1010 having a gateway function monitors communications conducted between inside and outside of the onboard computer system 1002. In this connection, the onboard computer system 1002 may further include the SIM 1052 of the communication module 1051.

In the following description, both the first ECU 1010 and the second ECUs 1020 will be simply referred to as ECUs when they are not necessarily discriminated from each other.

Server equipment 1300 receives or transmits data with the communication module 1051 of the TCU 1050 in the automobile 1001 through communication lines. For example, the server equipment 1300 and the communication module 1051 are connected together through private lines such as VPN (Virtual Private Network), and therefore they can receive or transmit data through private lines. For example, it is possible to provide private lines such as VPN using a wireless communication network supported by the SIM 1052.

The server equipment 1300 delivers ECU codes applied to ECUs to the automobile 1001. ECU codes represent one example of data applied to ECUs. Herein, ECU codes may be computer programs such as updated programs installed in ECUs, or they may be parameter setting values set to ECUs. The server equipment 1300 transmits an ECU code attached with an electronic signature to the automobile 1001. In this connection, the server equipment 1300 represents a data delivering apparatus.

Next, an example of a management method according to the present embodiment will be described with reference to FIGS. 2 to 11.

Management Method (Example 1)

Figure 2:
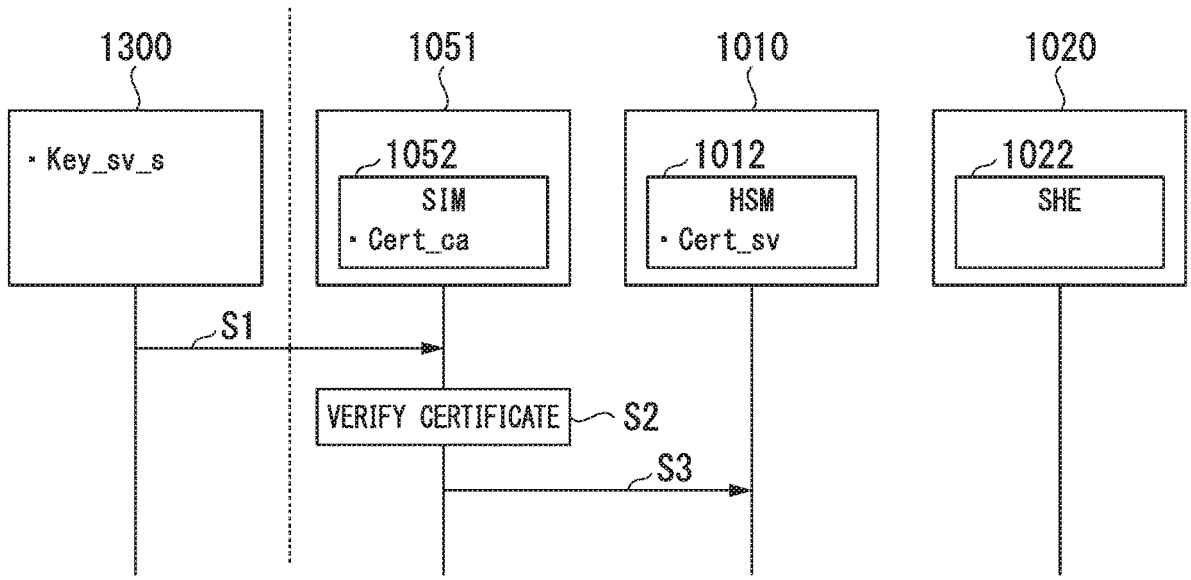
FIG. 2 is a sequence chart of a management method (Example 1) according to the first embodiment.

The management method of Example 1 according to the present embodiment will be described with reference to FIGS. 2 to 6. FIG. 2 is a sequence chart relating to the management method of Example 1 according to the present embodiment. According to the management method of Example 1, the SIM 1052 possesses a public key certificate Cert_ca (hereinafter, referred to as a certification-authority public key certificate Cert_ca) issued by a certification authority (CA). The key storage media 1053 of the SIM 1052 stores the certification-authority public key certificate Cert_ca. The certification-authority public key certificate Cert_ca has been safely stored on the SIM 1052 at the time of manufacturing the SIM 1052.

Alternatively, the certification-authority public key certificate Cert_ca can be delivered to the automobile 1001 through a secured communication path, e.g. private lines such as VPN, and then stored on the SIM 1052. For example, it is possible to provide private lines such as PVN through a wireless communication network supported by the SIM 1052.

First, a procedure of delivering a public key certificate Cert_sv of the server equipment 1300 (hereinafter, referred to as a server public key certificate Cert_sv) according to the management method of Example 1 will be described with reference to FIG. 2.

(Step S1)

The server equipment 1300 possesses its own secret key Key_sv_s (hereinafter, referred to as a server secret key key_sv_s). The server equipment 1300 transmits to the communication module 1051 of the automobile 1001 the server public key certificate Cert_sv relative to the server secret key Key_sv_s. The server public key certificate Cert_sv is issued by a certification authority. The certification-authority public key certificate Cert_ca is a public key certificate of a certification authority issuing the server public key certificate Cert_sv. That is, the server public key certificate Cert_sv is generated using a secret key of a certification authority relative to the certification-authority public key certificate Cert_ca.

(Step S2)

In the automobile 1001, the communication module 1051 receives the server public key certificate Cert_sv from the server equipment 1300 and then sends it to the SIM 1052. The SIM 1052 verifies the validity of the server public key certificate Cert_sv using the certification-authority public key certificate Cert_ca.

(Step S3)

The communication module 1051 sends to the first ECU 1010 the server public key certificate Cert_sv, which is successfully verified by the SIM 1052. The first ECU 1010 receives the server public key certificate Cert_sv from the communication module 1051 and then sends it to the HSM 1012. The key storage media 1013 of the HSM 1012 stores the server public key certificate Cert_sv sent from the communication module 1051.

The communication module 1051 discards the server public key certificate Cert_sv, which the SIM 1052 fails to verify. Therefore, the server public key certificate Cert_sv, which the SIM 1052 fails to verify, is not sent to the first ECU 1010. In this connection, the communication module 1051 may carry out an error process determined in advance when the SIM 1052 fails to verify the server public key certificate Cert_sv.

According to the management method of Example 1, the SIM 1052 installed in the automobile 1001 possesses the certification-authority public key certificate Cert_ca, and therefore the SIM 1052 verifies the validity of the server public key certificate Cert_sv using the certification-authority public key certificate Cert_ca. Herein, the SIM 1052 possesses the certification-authority public key certificate Cert_ca having high safety since the SIM 1052 is tamper resistant. Accordingly, the SIM 1052 can produce a highly reliable outcome when verifying the validity of the server public key certificate Cert_sv.

Next, an example of a procedure of delivering ECU codes according to the management method of Example 1 will be described with reference to FIGS. 3 to 6. In this connection, the following description refers to an example in which a procedure of delivering ECU codes shown in FIGS. 3 to 6 is applied to the second ECU 1020, however, it is possible to apply a similar procedure to ECU codes in the first ECU 1010 although the destination of applying ECU codes is changed to the first ECU 1010.

Procedure of Delivering ECU Codes (Example 1-a)

Figure 3:
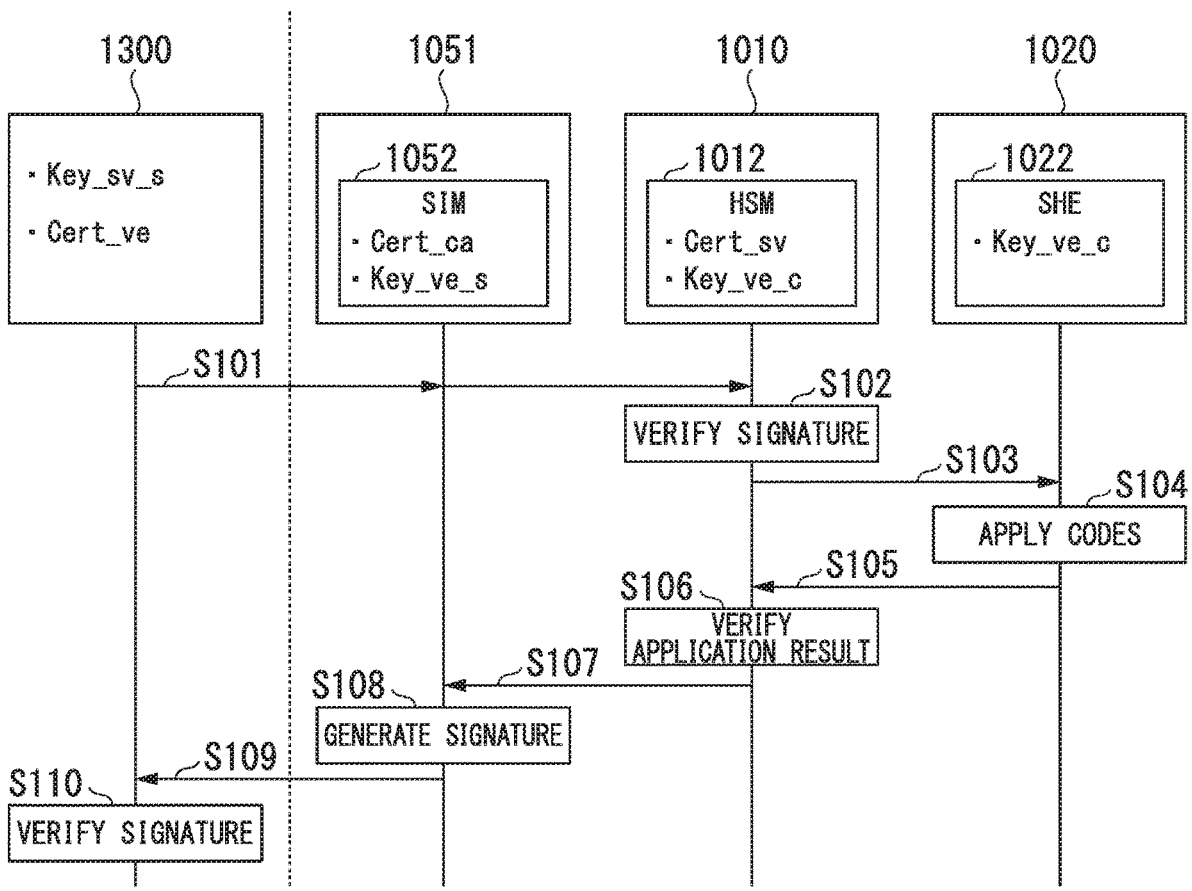
FIG. 3 is a sequence chart showing a procedure of delivering ECU codes (Example 1-a) according to the first embodiment.

FIG. 3 is a sequence chart showing a procedure of delivering ECU codes according to Example 1-a. The procedure of delivering ECU codes according to Example 1-a will be described with reference to FIG. 3. In FIG. 3, the server equipment 1300 possesses the server secret key Key_sv_s and a public key certificate Cert_ve of the automobile 1001 (hereinafter, referred to as an automobile public key certificate Cert_ve). In the automobile 1001, the SIM 1052 of the communication module 1051 possesses the certification-authority public key certificate Cert_ca and a secret key Key_ve_s of the automobile 1001 (hereinafter, automobile secret key Key_ve_s). The key storage media 1053 of the SIM 1052 stores the certification-authority public key certificate Cert_ca and the automobile secret key Key_ve_s.

The automobile public key certificate Cert_ve is a public key certificate relative to the automobile secret key Key_ve_s. Both the automobile secret key Key_ve_s and the automobile public key certificate Cert_ve are generated by an external device outside the automobile 1001, wherein the automobile secrete key Key_ve_s is stored on the ISM 1052 while the automobile public key certificate Cert_ve is stored on the server equipment 1300. In this connection, the automobile public key certificate Cert_ve includes attribute information, which may further include a vehicle identification number (VIN).

In the automobile 1001, the HSM 1012 of the first ECU 1010 possesses the server public key certificate Cert_sv and a common key Key_ve of the automobile 1001 (hereinafter, referred to as an automobile common key Key_ve_c). The key storage media 1013 of the HSM 1012 stored the server public key certificate Cert_sv and the automobile common key Key_ve_c. The server public key certificate Cert_sv stored on the key storage media 1013 of the HSM 1012 is successfully verified in validity according to the foregoing procedure of FIG. 2.

The SHE 1022 of the second ECU 1020 possesses the automobile common key Key_ve_c. The key storage media 1023 of the SHE 1022 stores the automobile common key Key_ve_c. Both the HSM 1012 of the first ECU 1010 and the SHE 1022 of the second ECU 1020 shares the same automobile common key Key_ve_c.

(Step S101)

The server equipment 1300 transmits an ECU code attached with an electronic signature to the automobile 1001. The ECU code attached with an electronic signature is generated using the server secret key Key_sv_s. In the automobile 1001, the communication module 1051 receives the ECU code attached with an electronic signature from the server equipment 1300 and then sends it to the first ECU 1010.

(Step S102)

The first ECU 1010 receives the ECU code attached with an electronic signature from the communication module 1051 and then sends it to the HSM 1012. The HSM 1012 verifies the electronic signature attached to the ECU code by use of the server public key certificate Cert_sv.

(Step S103)

The first ECU 1010 sends the ECU code attached with the electronic signature, which is successfully verified by the HSM 1012, to the second ECU 1020. On the other hand, the first ECU 1010 discards ECU codes each attached with an electronic signature, which the HSM 1012 fails to verify. Therefore, it is possible to prevent ECU codes each attached with an electronic signature which the HSM 1012 fails to verify from being sent to the second ECUs 1020. In this connection, the first ECU 1010 may carry out an error process determined in advance when the HSM 1012 fails to verify an electronic signature attached to ECU codes from the server equipment 1300.

(Step S104)

The second ECU 1020 receives an ECU code from the first ECU 1010 and then applies the ECU code by itself.

(Step S105)

The second ECU 1020 sends an applied-status measurement, representing the status of the second ECU 1020 applying the ECU code received from the first ECU 1010 by itself, to the first ECU 1010. In the present embodiment, the SHE 1022 calculates the applied-status measurement, i.e.

CMAC (Cipher-based Message Authentication Code) of the ECU code already applied to the second ECU 1020, by use of the automobile common key Key_ve_c. As the applied-status measurement, it is possible to calculate HMAC (Hash-based Message Authentication Code) of the ECU code already applied to the second ECU 1020.

(Step S106)

The first ECU 1010 verifies the applied-status measurement received from the second ECU 1020. To verify the applied-status measurement in the present embodiment, the first ECU 1010 calculates the CMAC of the ECU code, which has been sent to the second ECU 1020 in step S103, by use of the automobile common key Key_ve_c. Then, the first ECU 1010 compares the CMAC calculated by the HSM 1012 with the CMAC of the applied-status measurement received from the second ECU 1020 so as to determine whether those values of CMAC match with each other.

The first ECU 1010 successfully verifies the applied-status measurement when the determination result indicates a match between the values of CMAC, but it fails to verify the applied-status measurement when the determination result indicates un-match between the values of CMAC. In this connection, the first ECU 1010 may carry out an error process determined in advance when it fails to verify the applied-status measurement.

(Step S107)

The first ECU 1010 sends to the communication module 1051 the application result information representing the result of applying the ECU code already sent to the second ECU 1020 in step S103. As the application result information, it is possible to use the ECU code already sent to the second ECU 1020 in step S103. Alternatively, it is possible to use the applied-status measurement received from the second ECU 1020 as the application result information.

(Step S108)

The communication module 1051 receives the application result information from the first ECU 1010 and then sends it to the SIM 1052. The SIM 1052 generates an electronic signature attached to the application result information by use of the automobile secret key Key_ve_s.

(Step S109)

The communication module 1051 sends to the server equipment 1300 the application result information attached with the electronic signature generated by the SIM 1052.

(Step S110)

The server equipment 1300 verifies an electronic signature attached to the application result information, which is received from the communication module 1041 of the automobile 1001, by use of the automobile public key certificate Cert_ve. The server equipment 1300 determines that the application result information attached with the electronic signature which is successfully verified is acceptable. On the other hand, the server equipment 1300 discards the application result information attached with an electronic signature for which verification failed. In this connection, the server equipment 1300 may carry out an error process determined in advance when the application result information, which is received from the communication module 1051 of the automobile 1001, attached with the electronic signature for which verification failed. The server equipment 1300 may use the application result information, which is determined to be acceptable, for the purpose of analyzing the applied status of the ECU code.

According to the procedure of delivering ECU codes of Example 1-a, the HSM 1012 of the first ECU 1010 verifies the electronic signature attached to the ECU code, which is received from the server equipment 1300, by use of the server public key certificate Cert_sv. The server public key certificate Cert_sv has been already verified in validity by the SIM 1052 of the communication module 1051 using the certification-authority public key certificate Cert_ca. Thus, it is possible for the HSM 1012 of the first ECU 1010 to produce a highly reliable result in verifying electronic signatures attached to ECU codes. Accordingly, it is possible to improve the reliability of verifying the validity of ECU codes applied to ECUs.

Procedure of Delivering ECU Codes (Example 1-b)

Figure 4:
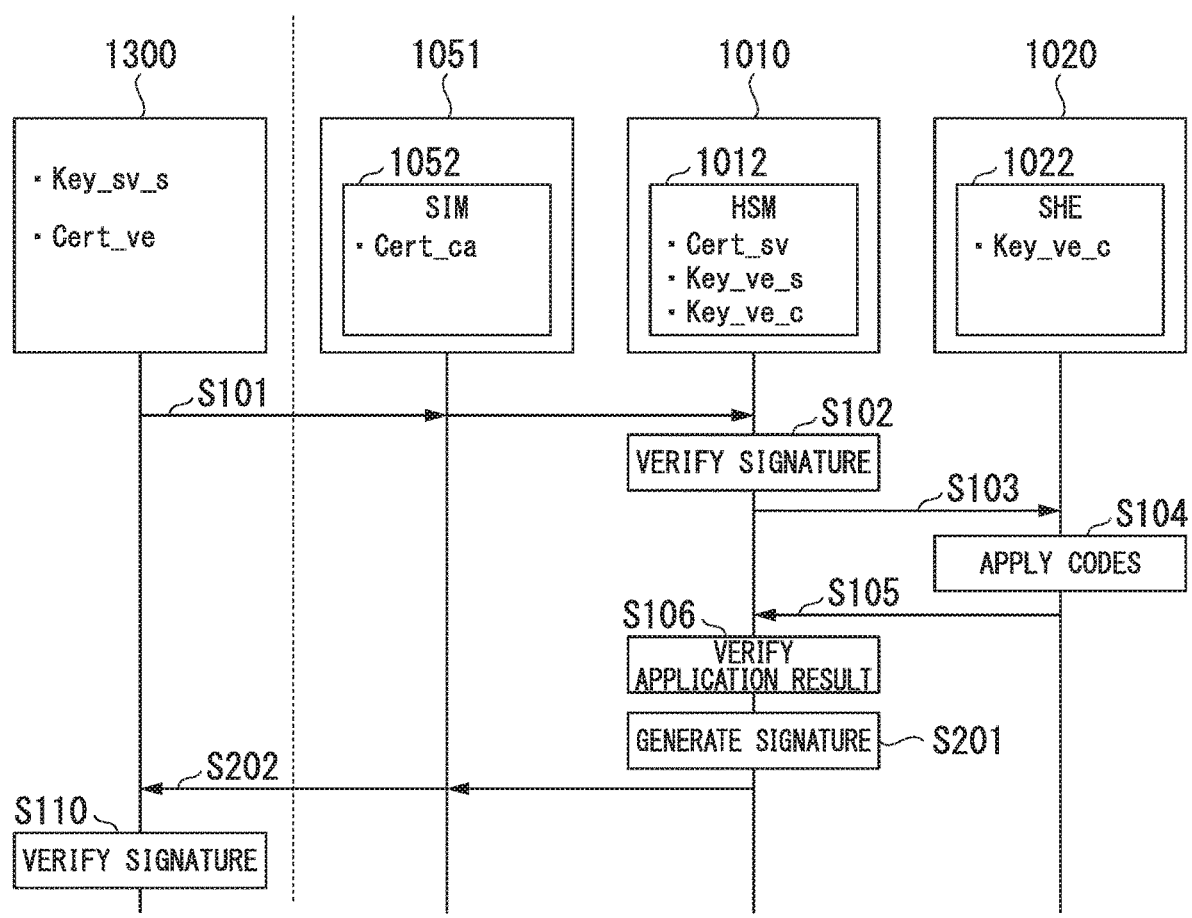
FIG. 4 is a sequence chart showing a procedure of delivering ECU codes (Example 1-b) according to the first embodiment.

FIG. 4 is a sequence chart showing the procedure of delivering ECU codes of Example 1-b. The procedure of delivering ECU codes of Example 1-b will be described with reference to FIG. 4. In FIG. 4, parts identical to those of FIG. 3 are denoted using the same reference signs; hence, their descriptions will be omitted here. The sequence chart of FIG. 4 differs from the sequence chart of FIG. 3 in that the HSM 1012 of the first ECU 1010 possesses the automobile secret key Key_ve_s. In FIG. 4, the key storage media 1013 of the HSM 1012 stores the server public key certificate Cert_sv and the automobile common key Key_ve_c. In this connection, the key storage media 1013 of the HSM 1012 stores the server public key certificate Cert_sv, which has been already verified in validity according to the foregoing procedure of FIG. 2. Hereinafter, the following description mainly refers to different points than the procedure of delivering ECU codes of Example 1-a.

In FIG. 4, the first ECU 1010 carries out a series of steps S101 to S106. A series of steps S101 to S106 are identical to the foregoing steps S101 to S106 involved in the procedure of delivering ECU codes of Example 1-a shown in FIG. 3. Then, the step S201 following the step S106 will be carried out.

(Step S201)

The first ECU 1010 sends the application result information representing the result of applying ECU codes, which are sent to the second ECU 1020 in step S103, to the HSM 1012. The HSM 1012 generates an electronic signature applied to the application result information by use of the automobile secret key Key_ve_s. As the application result information, it is possible to use ECU codes sent to the second ECU 1020 in step S103. Alternatively, it is possible to use an applied-status measurement, which is received from the second ECU 1020, as the application result information.

(Step S202)

The first ECU 1010 sends to the communication module 1051 the application result information attached with an electronic signature generated by the HSM 1012. The communication module 1051 receives the application result information attached with the electronic signature from the first ECU 1010 and then transmits it to the server equipment 1300.

Next, the step S110 will be executed. The step S110 is identical to the foregoing step S110 involved in the procedure of delivering ECU codes of Example 1-a shown in FIG. 3.

According to the procedure of delivering ECU codes of Example 1-b similar to the procedure of delivering ECU codes of Example 1-a, it is possible to improve the reliability of verifying the validity of ECU codes applied to ECUs. According to the procedure of delivering ECU codes of Example 1-b, the HSM 1012 of the first ECU 1010 possesses the automobile secret key Key_ve_s, and therefore the HSM 1012 generates an electronic signature attached to the application result information by use of the automobile secret key Key_ve_s. According to the procedure of delivering ECU codes of Example 1-b, it is possible to make encryption processing efficient since the HSM 1012 has higher encryption processing performance than the SIM 1052.

Procedure of Delivering ECU Codes (Example 1-c)

Figure 5:
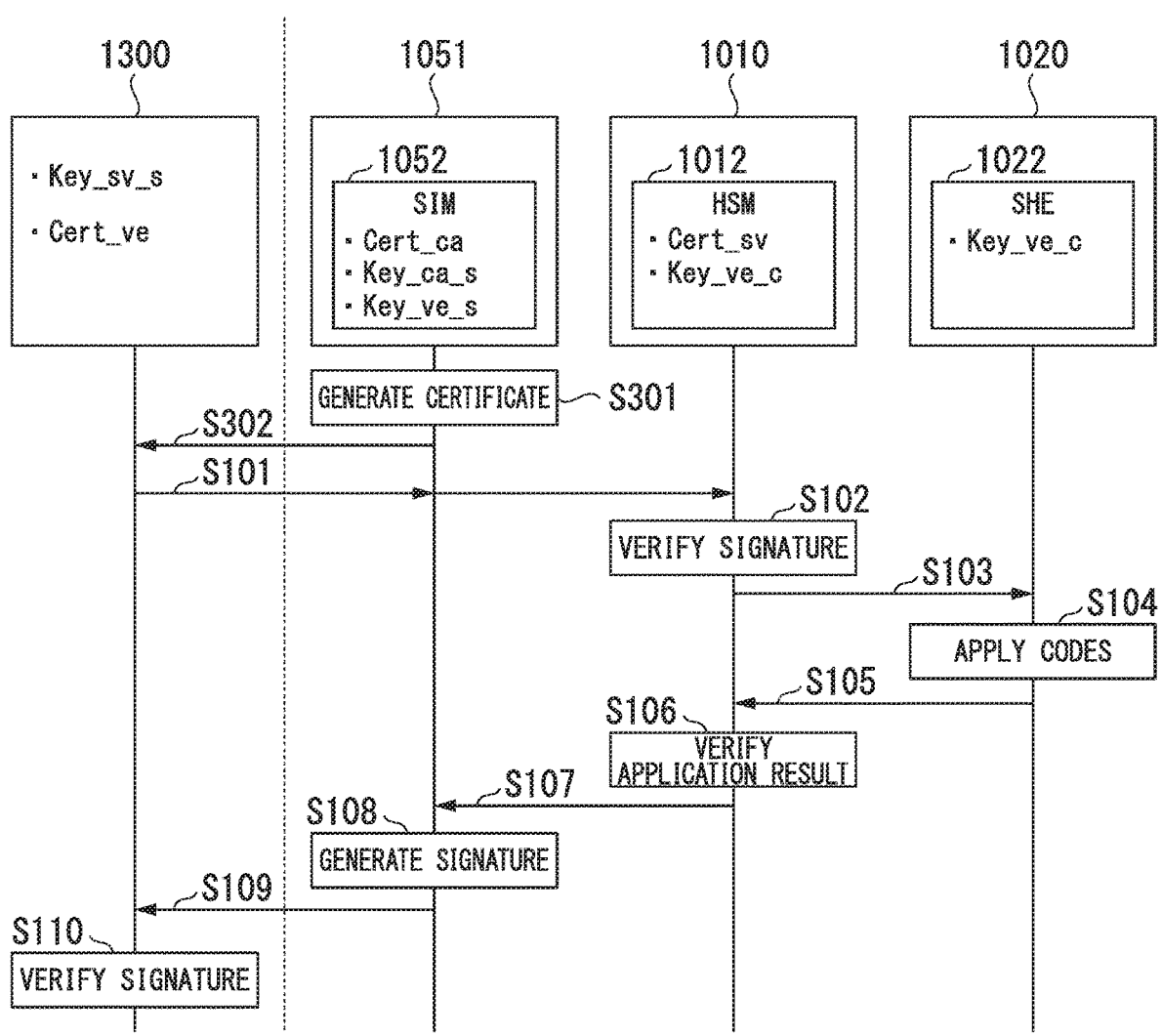
FIG. 5 is a sequence chart showing a procedure of delivering ECU codes (Example 1-c) according to the first embodiment.

FIG. 5 is a sequence chart showing the procedure of delivering ECU codes according to Example 1-c. The procedure of delivering ECU codes of Example 1-c will be described with reference to FIG. 5. In FIG. 5, parts identical to those shown in FIG. 3 are denoted using the same reference numerals; hence, descriptions thereof will be omitted here. The procedure of FIG. 5 differs from the procedure of FIG. 3 in that the SIM 1052 of the communication module 1051 possesses a secret key Key_ca_s of the certification authority (hereinafter, referred to as a certification-authority secret key Key_ca_s), and therefore the SIM 1052 generates the automobile secret key Key_ve_s and the automobile public key certificate Cert_ve.

The certification-authority secret key Key_ca_s is relative to the certification-authority public key certificate Cert_ca. In this connection, the certification-authority public key certificate Cert_ca may be a public key certificate of a certification authority issuing the server public key certificate Cert_sv. The server public key certificate Cert_sv may be a public key certificate issued by another certification authority such as an official third-party authority. Alternatively, the server public key certificate Cert_sv may be a public key certificate which is generated by a private certification authority for the SIM 1052 of the automobile 1001 by use of the certification-authority secret key Key_ca_s.

The SIM 1052 has a function to generate the automobile secret key Key_ve_s and the automobile public key certificate Cert_ve. The key storage media 1053 of the SIM 1052 stores the certification-authority public key certificate Cert_ca, the certification-authority secret key Key_ca_s, and the automobile secret key Key_ve_s. The following description mainly refers to differences between the procedure of delivering ECU codes of Example 1-c shown in FIG. 3 and the procedure of delivering ECU codes of Example 1-a shown in FIG. 3.

(Step S301)

In the automobile 1001, the SIM 1052 of the communication module 1051 generates the public key of the automobile 1001 and the automobile secret key Key_ve_s. The SIM 1052 generates a public key certificate for the public key of the automobile 1001 (i.e. the automobile public key certificate Cert_ve) by use of the certification-authority secret key Key_ca_s.

(Step S302)

The communication module 1051 transmits to the server equipment 1300 the automobile public key certificate Cert_ve generated by the SIM 1052. The server equipment 1300 receives and stores the automobile public key certificate Cert_ve from the communication module 1051.

Next, a series of steps S101 to S110 are executed. A series of steps S101 to S110 are identical to the foregoing steps S101 to S110 involved in the procedure of delivering ECU codes of Example 1-a shown in FIG. 3.

According to the procedure of delivering ECU codes of Example 1-c similar to the procedure of delivering ECU codes of Example 1-a, it is possible to improve the reliability of verifying the validity of ECU codes applied to ECUs. According to the procedure of delivering ECU codes of Example 1-c, the SIM 1052 having the certification-authority secret key Key_ca_s, which is installed in the automobile 1001, servers as a private certification authority. Thus, it is possible for the automobile 1001 to generate the automobile secret key Key_ve_s and the automobile public key certificate Cert_ve. In this connection, for example, the certification-authority secret key Key_ca_s and the certification-authority public key certificate Cert_ca, which are installed in the automobile 1001, can be changed depending on the manufacture, type, and year of the automobile.

Procedure of Delivering ECU Codes (Example 1-d)

Figure 6:
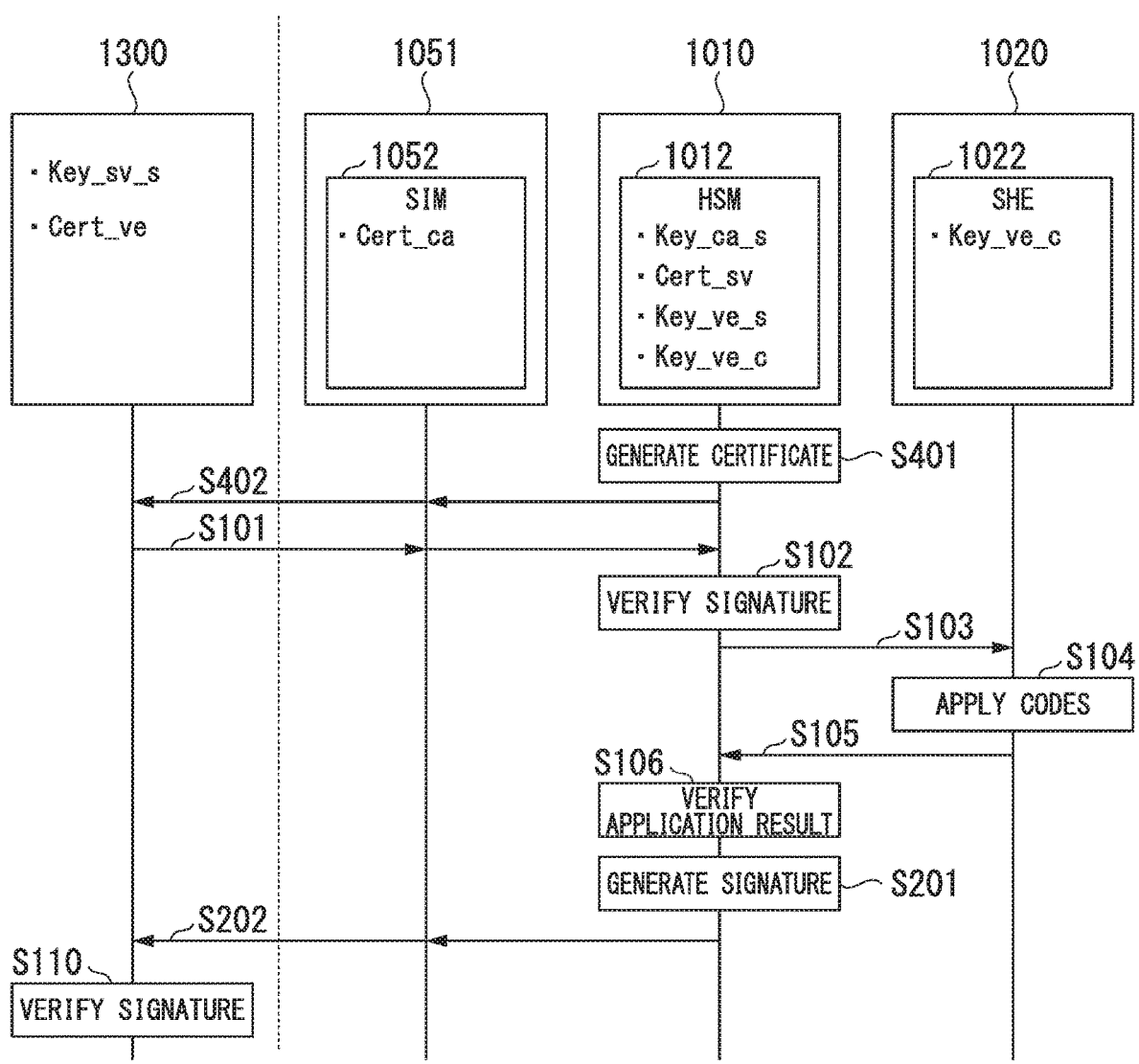
FIG. 6 is a sequence chart showing a procedure of delivering ECU codes (Example 1-d) according to the first embodiment.

FIG. 6 is a sequence chart showing the procedure of delivering ECU codes according to Example 1-d. The procedure of delivering ECU codes of Example 1-d will be described with reference to FIG. 6. In FIG. 6, parts identical to those shown in FIG. 4 are denoted using the same reference numerals; hence, descriptions thereof will be omitted here. The procedure of FIG. 6 differs from the procedure of FIG. 4 in that the HSM 1012 of the first ECU 1010 possesses the certification-authority secret key Key_ca_s, and therefore the HSM 1012 generates the automobile secret key Key_ve_s and the automobile public key certificate Cert_ve.

The certification-authority secret key Key_ca_s is relative to the certification-authority public key certificate Cert_ca. In this connection, the certification-authority public key certificate Cert_ca may be a public key certificate of a certification authority issuing the server public key certificate Cert_sv. The server public key certificate Cert_sv may be a public key certificate issued by another certification authority such as an official third-party authority. Alternatively, the server public key certificate Cert_sv may be a public key certificate which is generated by a private certification authority for the SIM 1052 of the automobile 1001 by use of the certification-authority secret key Key_ca_s.

The HSM 1012 has a function to generate the automobile secret key Key_ve_s and the automobile public key certificate Cert_ve. The key storage media 1013 of the HSM 1012 stores the certification-authority secret key Key_ca_s, the server public key certificate Cert_sv, the automobile secret key Key_ve_s, and the automobile common key Key_ve_c. The key storage media 1013 of the HSM 1012 stores the server public key certificate Cert_sv, which has been already verified in validity by way of the foregoing procedure of FIG. 2. The following description mainly refers to differences between the procedure of delivering ECU codes of Example 1-d shown in FIG. 6 and the procedure of delivering ECU codes of Example 1-b shown in FIG. 4.

(Step S401)

In the automobile 1001, the HSM 1012 of the first ECU 1010 generates the public key of the automobile 1001 and the automobile secret key Key_ve_s. The HSM 1012 generates the public key certificate for the public key of the automobile 1001 (i.e. automobile public key certificate Cert_ve) by use of the certification-authority secret key Key_ca_s.

(Step S402)

The first ECU 1010 transmits to the communication module 1051 the automobile public key certificate Cert_ve generated by the HSM 1012. The communication module 1051 receives the automobile public key certificate Cert_ve from the first ECU 1010 and then transmits it to the server equipment 1300. The sever equipment 1300 receives and stores the automobile public key certificate Cert_ve from the communication module 1051.

Next, a series of steps S101 to S106, S201, S202, and S110 are executed. A series of steps S101 to S106, S201, S202, and S110 are identical to the foregoing steps S101 to S106, S201, S202, and S110 involved in the procedure of delivering ECU codes of Example 1-b shown in FIG. 4.

According to the procedure of delivering ECU codes of Example 1-d similar to the foregoing procedure of delivering ECU codes of Example 1a, it is possible to improve the reliability of verifying the validity of ECU codes applied to ECUs. Similar to the foregoing procedure of delivering ECU codes of Example 1-b, it is possible to make encryption processing efficient.

According to the procedure of delivering ECU codes of Example 1-d, the HSM 1012 having the certification-authority secret key Key_ca_s, which is installed in the automobile 1001, serves as a private certification authority. Thus, it is possible for the automobile 1001 to generate the automobile secret key Key_ve_s and the automobile public key certificate Cert_ve. For example, the certification-authority secret key Key_ca_s and the certification-authority public key certificate Cert_ca, which are installed in the automobile 1001, may be changed depending on the manufacture, type, and year of the automobile.

Management Method (Example 2)

Figure 7:
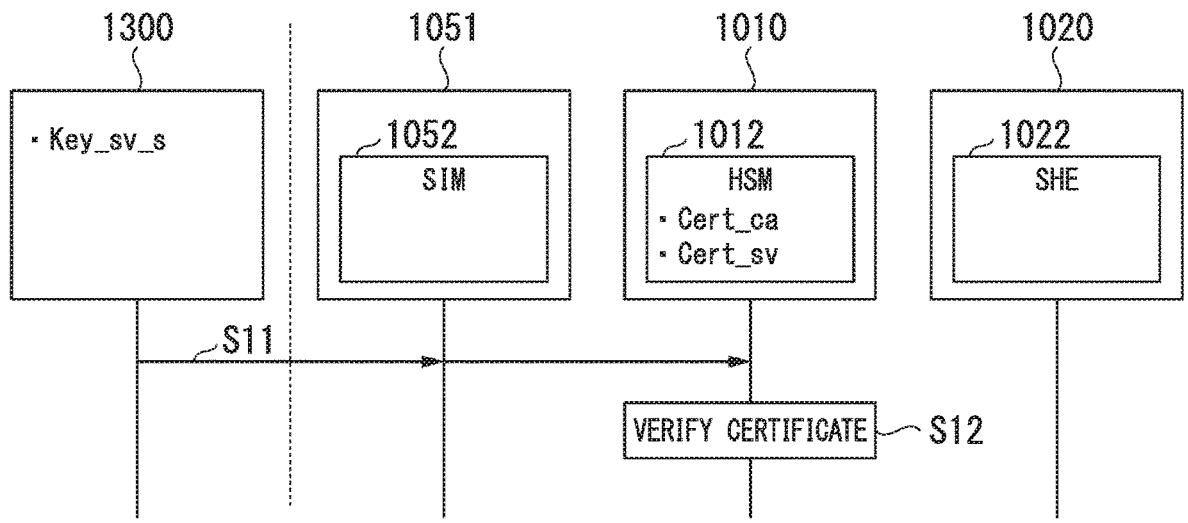
FIG. 7 is a sequence chart of a management method (Example 2) according to the first embodiment.

The management method of Example 2 according to the present embodiment will be described with reference to FIGS. 7 to 11. FIG. 7 is a sequence chart relating to the management method of Example 2 according to the present embodiment. According to the management method of Example 2, the HSM 1012 possesses the certification-authority public key certificate Cert_ca and the server public key certificate Cert_sv. The storage media 1013 of the HSM 1012 stores the certification-authority public key certificate Cert_ca and the server public key certificate Cert_sv. The certification-authority public key certificate Cert_ca is safely stored on the HSM 1012 when manufactured. In addition, the certification-authority public key certificate Cert_ca may be transmitted to the automobile 1001 through a secure communication path, e.g. a private line such as VPN, and then stored on the HSM 1012. For example, the communication network supported by the HSM 1052 may provide a private line such as VPN.

First, a procedure of delivering the server public key certificate Cert_s according to the management method of Example 2 will be described with reference to FIG. 7.

(Step S11)

The server equipment 1300 provides the server secret key Key_sv_s. The server equipment 1300 transmits the server public key certificate Cert_sv relative to the serve secret key Key_sv_s to the communication module 1051 of the automobile 1001. The server public key certificate Cert_sv is issued by a certification authority. The certification-authority public key certificate Cert_ca is a public key certificate issued by a certification authority issuing the server public key certificate Cert_sv. That is, the server public key certificate Cert_sv is generated using a secret key of a certification authority relative to the certification-authority public key certificate Cert_ca.

In the automobile 1001, the communication module 1051 receives the server public key certificate Cert_sv from the server equipment 1300 and then sends it to the first ECU 1010.

(Step S12)

In the automobile 1001, the first ECU 1010 receives the server public key certificate Cert_sv from the communication module 1051 and then sends it to the HSM 1012.

The HSM 1012 verifies the validity of the server public key certificate Cert_sv using the certification-authority public key certificate Cert_ca. The HSM 1012 stores on the key storage media 1013 the server public key certificate Cert_sv which is successfully varied.

On the other hand, the HSM 1012 discards the server public key certificate Cert_sv for which verification failed. Therefore, it is possible for the HSM 1012 to prevent the server public key certificate Cert_sv, for which verification failed, from being stored therein. In addition, the first ECU 1010 may carry out an error process determined in advance when verification of the server public key certificate Cert_sv fails.

According to the management method of Example 2, the HSM 1012 installed in the automobile 1001 possesses the certification-authority public key certificate Cert_ca, and therefore the HSM 1012 verifies the validity of the server public key certificate Cert_sv by use of the certification-authority public key certificate Cert_ca. The HSM 1012 possesses the certification-authority public key certificate Cert_ca having high safety since the HSM 1012 is tamper resistant. For this reason, it is possible for the HSM 1012 to produce a highly reliable result in verifying the validity of the server public key certificate Cert_sv. In addition, it is possible for the HSM 1012 to make encryption processing efficient due to higher encryption processing performance of the HSM 1012 than the SIM 1052.

Next, an example of the procedure of delivering ECU codes according to the management method of Example 2 will be described with reference to FIGS. 8 to 11. The example of the processing of delivering ECU codes shown in FIGS. 8 to 11 refers to an example of ECU codes applied to the second ECU 1020. However, it is possible to apply a similar procedure to other ECU codes applied to the first ECU 1010 even though the destination of applying ECU codes is changed to the first ECU 1010.

Procedure of Delivering ECU Codes (Example 2-a)

Figure 8:
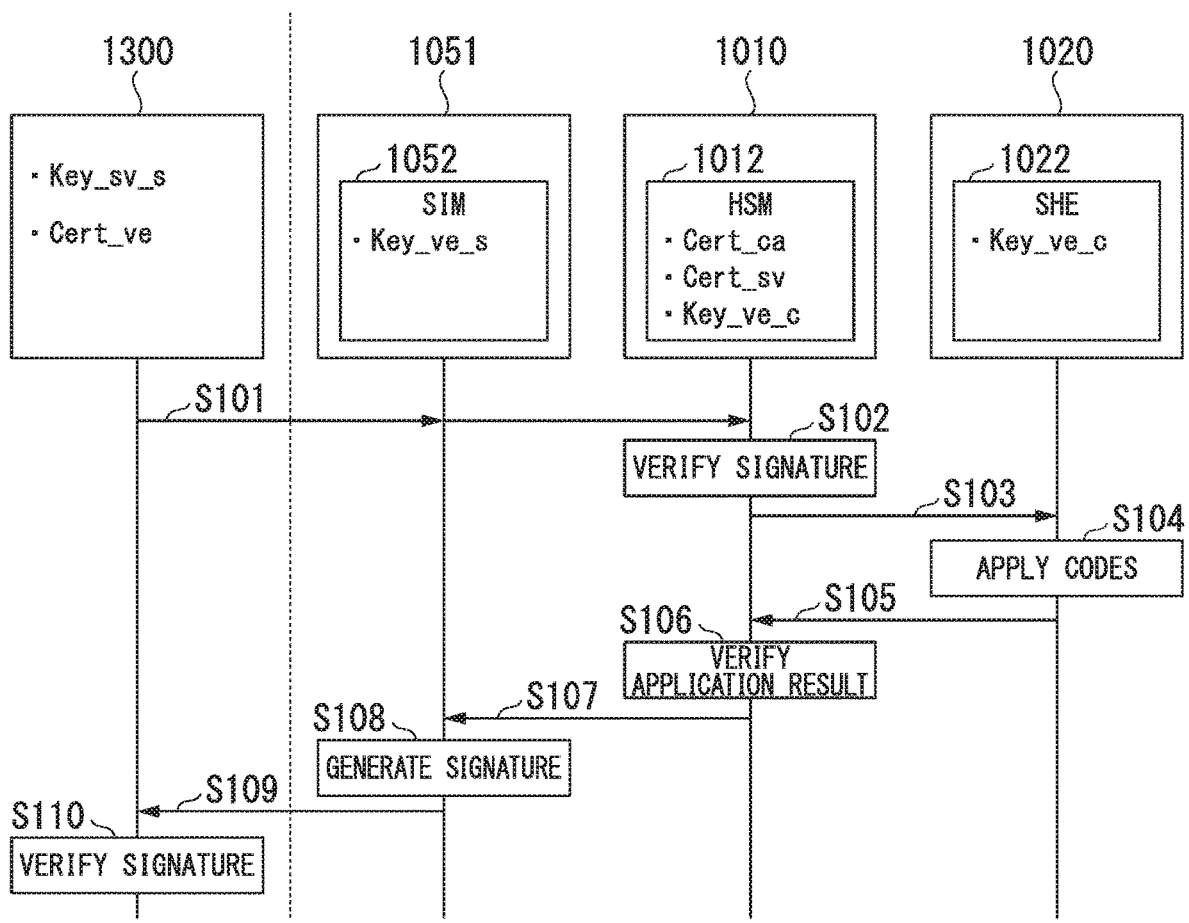
FIG. 8 is a sequence chart showing a procedure of delivering ECU codes (Example 2-a) according to the first embodiment.

FIG. 8 is a sequence chart showing the procedure of delivering ECU codes according to Example 2-a. The procedure of delivering ECU codes of Example 2-a will be described with reference to FIG. 8. In FIG. 8, parts identical to those shown in FIG. 3 are denoted using the same reference signs; hence, descriptions thereof will be omitted here. The procedure of FIG. 8 differs from the procedure of FIG. 3 in that the HSM 1012 of the first ECU 1010 possesses the certification-authority public key certificate Cert_ca. The key storage media 1013 of the HSM 1012 stores the certification-authority public key certificate Cert_ca, the server public key certificate Cert_sv, and the automobile common key Key_ve_c. The key storage media 1013 of the HSM 1012 stores the server public key certificate Cert_sv which has been successfully verified in validity according to the foregoing procedure of FIG. 7.

In FIG. 8, a series of step S101 to S110 are executed. Herein, a series of step S101 to S110 are identical to a series of steps S101 to S110 involved in the procedure of delivering ECU codes of Example 1-a shown in FIG. 3.

According to the procedure of delivering ECU codes of Example 2-a, the HSM 1012 of the first ECU 1010 receives ECU codes attached with an electronic signature from the server equipment 1300 and then verifies the electronic signature by use of the server public key certificate Cert_sv. The server public key certificate Cert_sv has been successfully verified in validation by the HSM 1012 of the first ECU 1010. Therefore, it is possible for the HSM 1012 of the first ECU 1010 to produce a highly reliable result in verifying electronic signatures attached to ECU codes. Thus, it is possible to improve reliability of verifying the validity of ECU codes applied to ECUs.

Procedure of Delivering ECU Codes (Example 2-b)

Figure 9:
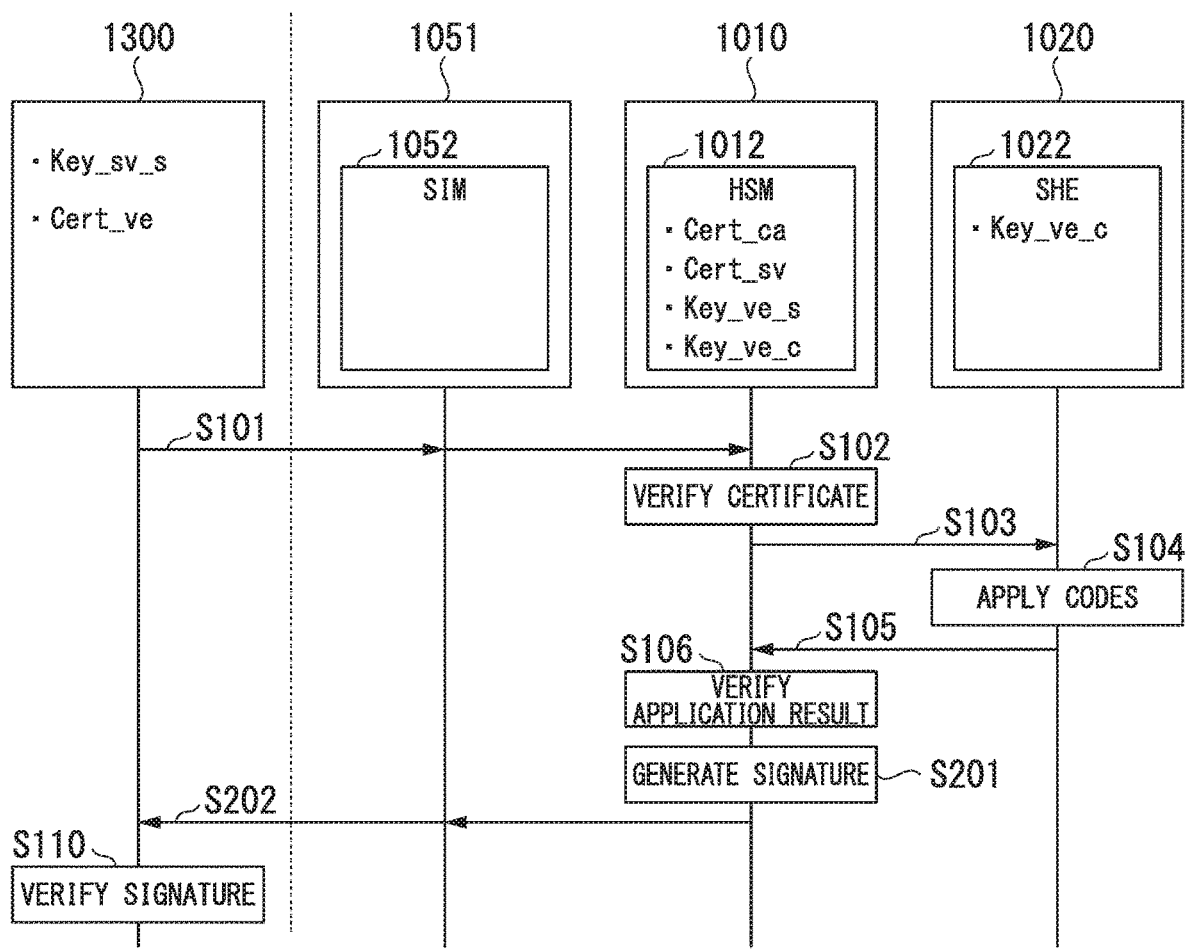
FIG. 9 is a sequence chart showing a procedure of delivering ECU codes (Example 2-b) according to the first embodiment.

FIG. 9 is a sequence chart showing the procedure of delivering ECU codes of Example 2-a. The procedure of delivering ECU codes of Example 2-b will be described with reference to FIG. 9. In FIG. 9, parts identical to those shown in FIG. 4 are denoted using the same reference numerals; hence, descriptions thereof will be omitted here. The procedure of FIG. 9 differs from the procedure of FIG. 4 in that the HSM 1012 of the first ECU 1010 possesses the certification-authority public key certificate Cert_ca. In FIG. 9, the key storage media 1013 of the HSM 1012 stores the certification-authority public key certificate Cert_ca, the server public key certificate Cert_sv, the automobile secret key Key_ve_s, and the automobile common key Key_ve_c. The key storage media 1013 of the HSM 1012 stores the server public key certificate Cert_sv, which has been successfully verified in validation according to the foregoing procedure of FIG. 7.

In FIG. 9, a series of steps S101 to S106, S201, S202, and S110 are executed. A series of steps S101 to S106, S201, S202, and S110 are identical to those of the foregoing procedure of delivering ECU codes of Example 1-b.

According to the procedure of delivering ECU codes of Example 2-b similar to the foregoing procedure of delivering ECU codes of Example 2-a, it is possible to improve the reliability of verifying the validity of ECU codes applied to ECUs. According to the procedure of delivering ECU codes of Example 2-b, the HSM 1012 of the first ECU 1010 possesses the automobile secret key Key_ve_s, and therefore the HSM 1012 generates an electronic signature attached to the application result information by use of the automobile secret key Key_ve_s. Thus, it is possible to make encryption processing efficient according to the procedure of delivering ECU codes of Example 2-b due to higher encryption processing performance of the HSM 1012 than the SIM 1052.

Procedure of Delivering ECU Codes (Example 2-c)

Figure 10:
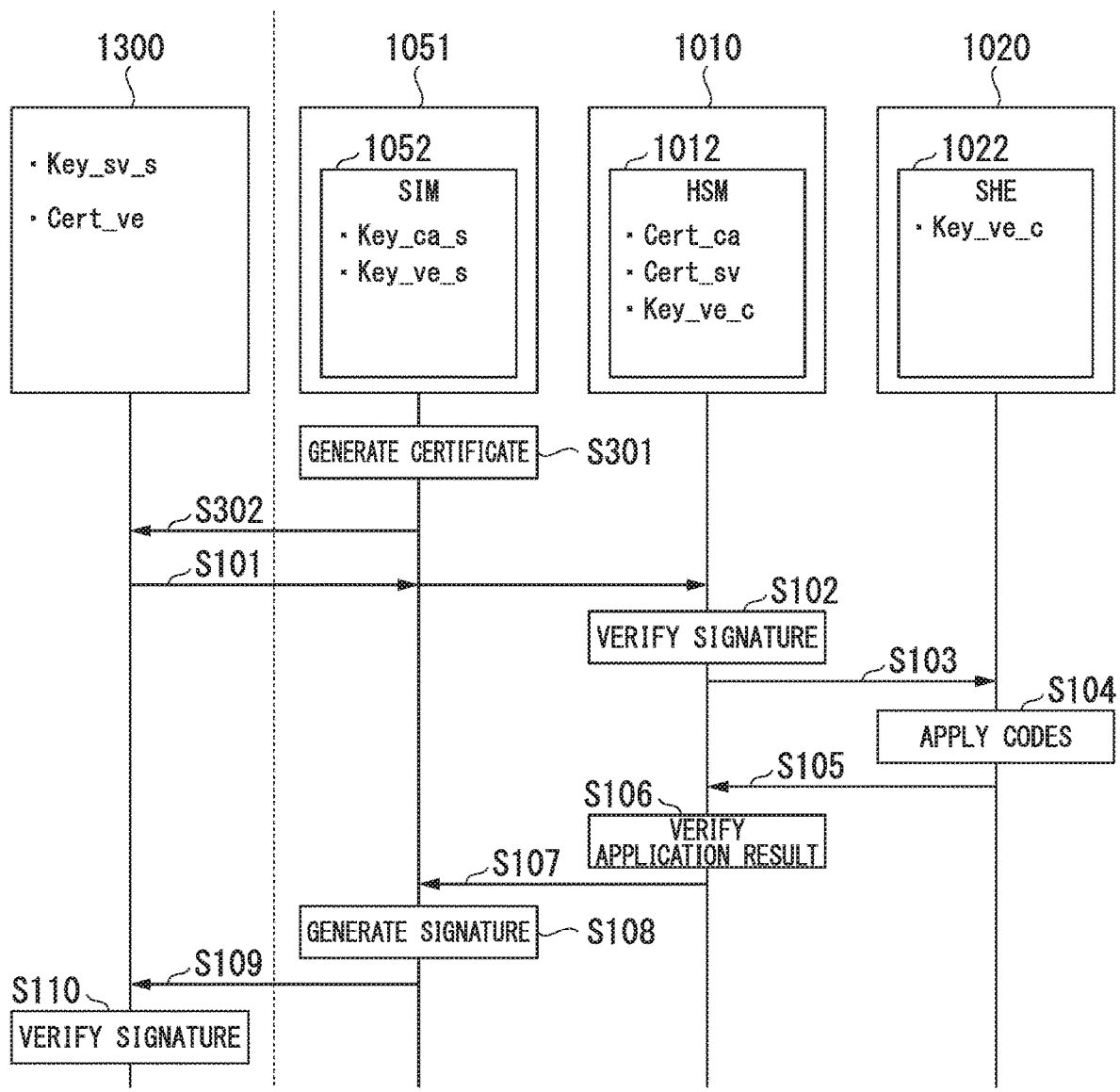
FIG. 10 is a sequence chart showing a procedure of delivering ECU codes (Example 2-c) according to the first embodiment.

FIG. 10 is a sequence chart showing the procedure of delivering ECU codes according to Example 2-c. The procedure of delivering ECU codes according to Example 2-c will be described with reference to FIG. 10. In FIG. 10, parts identical to those shown in FIG. 5 are denoted using the same reference signs; hence, descriptions thereof will be omitted here. The procedure of FIG. 10 differs from the procedure of FIG. 5 in that the HSM 1012 of the first ECU 1010 possesses the certification-authority public key certificate Cert_ca. In FIG. 10, the key storage media 1013 of the HSM 1012 stores the certification-authority public key certificate Cert_ca, the server public key certificate Cert_sv, and the automobile common key Key_ve_c. In this connection, the key storage media 1013 of the HSM 1012 stores the server public key certificate Cert_sv, whose validity is successfully verified, according to the foregoing procedure of FIG. 7.

In FIG. 10, a series of steps S301, S302, S101 to S110 are executed. Herein, a series of steps S301, S302, S101 to S110 are identical to those of the foregoing procedure of delivering ECU codes of Example 1-c shown in FIG. 5.

According to the procedure of delivering ECU codes of Example 2-c similar to the foregoing procedure of delivering ECU codes of Example 2-a, it is possible to improve the reliability of verifying the validity of ECU codes applied to ECUs. According to the procedure of delivering ECU codes of Example 2-c, the SIM 1052 installed in the automobile 1001 serves as a private certification authority because it possesses the certification-authority secret key Key_ca_s. Thus, it is possible for the automobile 1001 to generate the automobile secret key Key_ve_s and the automobile public key certificate Cert_ve. The automobile 1001 possesses the certification-authority secret key Key_ca_s and the certification-authority public key certificate Cert_ca, which can be changed depending on the manufacture, type, and year of the automobile.

Procedure of Delivering ECU Codes (Example 2-d)

Figure 11:
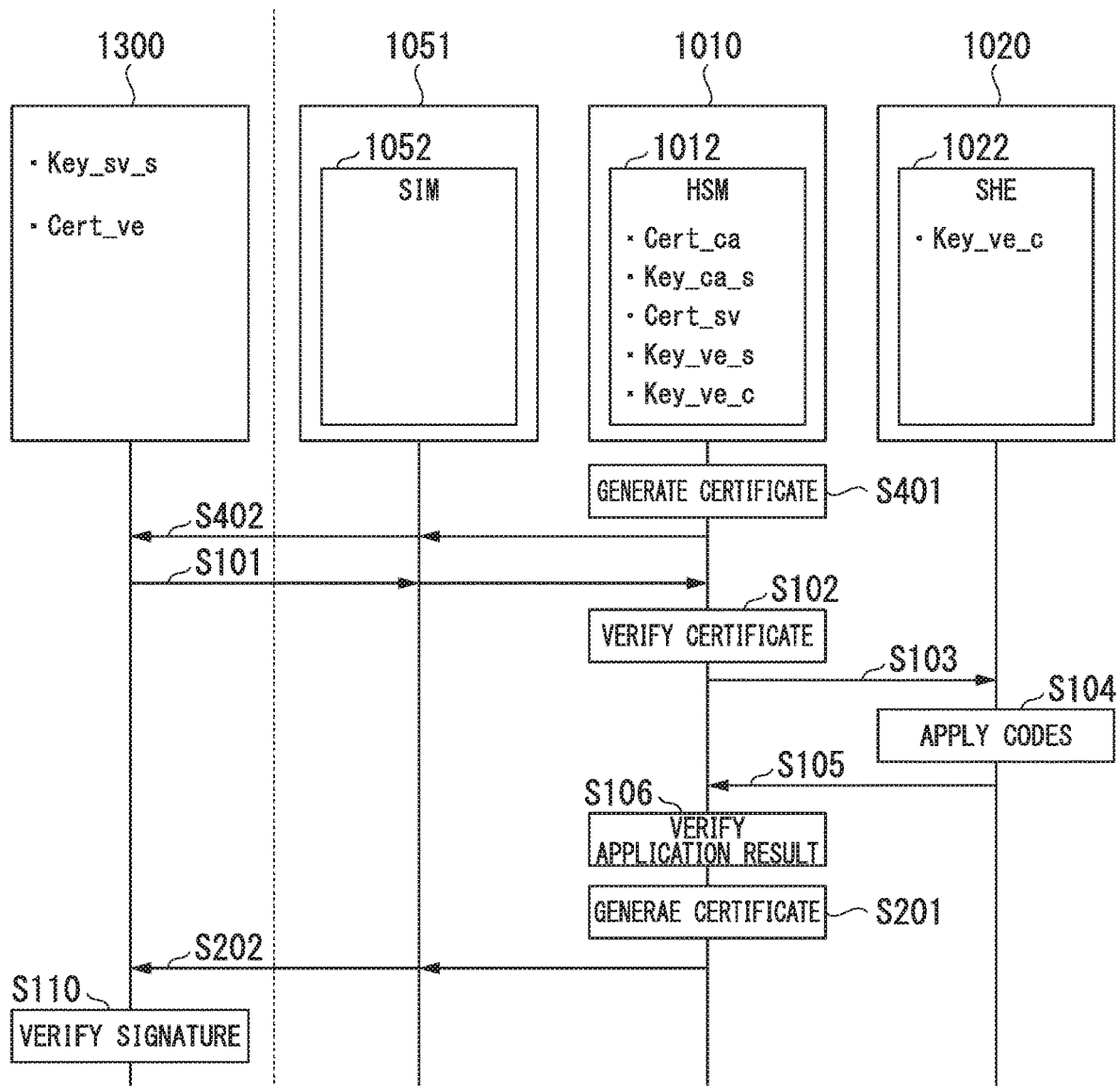
FIG. 11 is a sequence chart showing a procedure of delivering ECU codes (Example 2-d) according to the first embodiment.

FIG. 11 is a sequence chart showing the procedure of delivering ECU codes according to Example 2-d. The procedure of delivering ECU codes according to Example 2-d will be described with reference to FIG. 11. In FIG. 11, parts identical to those shown in FIG. 6 are denoted using the same reference signs; hence, descriptions thereof will be omitted here. The procedure of FIG. 11 differs from the procedure of FIG. 6 in that the HSM 1012 of the first ECU 1010 possesses the certification-authority public key certificate Cert_ca. In FIG. 11, the key storage media 1013 of the HSM 1012 stores the certification-authority public key certificate Cert_ca, the certification-authority secret key Key_ve_s, the server public key certificate Cert_sv, the automobile secret key Key_ve_s, and the automobile common key Key_ve_c. The key storage media 1013 of the HSM 1012 stores the server public key certificate Cert_sv, which has been successfully verified in validity according to the foregoing procedure of FIG. 7.

In FIG. 11, a series of steps S401, S402, 101 to S106, S201, S202, and S110 are executed. Herein, a series of steps S401, S402, 101 to S106, S201, S202, and S110 are identical to those of the foregoing procedure of delivering ECU codes of Example 1-d shown in FIG. 6.

According to the procedure of delivering ECU codes of Example 2-d similar to the foregoing procedure of delivering ECU codes of Example 2-a, it is possible to improve the reliability of verifying the validity of ECU codes applied to ECUs. Similar to the foregoing procedure of delivering ECU codes of Example 1-d, it is possible to make encryption processing efficient.

According to the procedure of delivering ECU codes of Example 2-d, the HSM 1012 installed in the automobile 1001 serves as a private certification authority because it possesses the certification-authority secret key Key_ca_s. Thus, it is possible for the automobile 1001 to generate the automobile secret key Key_ve_s and the automobile public key certificate Cert_ve. In this connection, the automobile 1001 stores the certification-authority secret key Key_ca_s and the certification-authority public key certificate Cert_ca, which can be changed depending on the manufacture, type, and year of the automobile.

Second Embodiment

Figure 12:
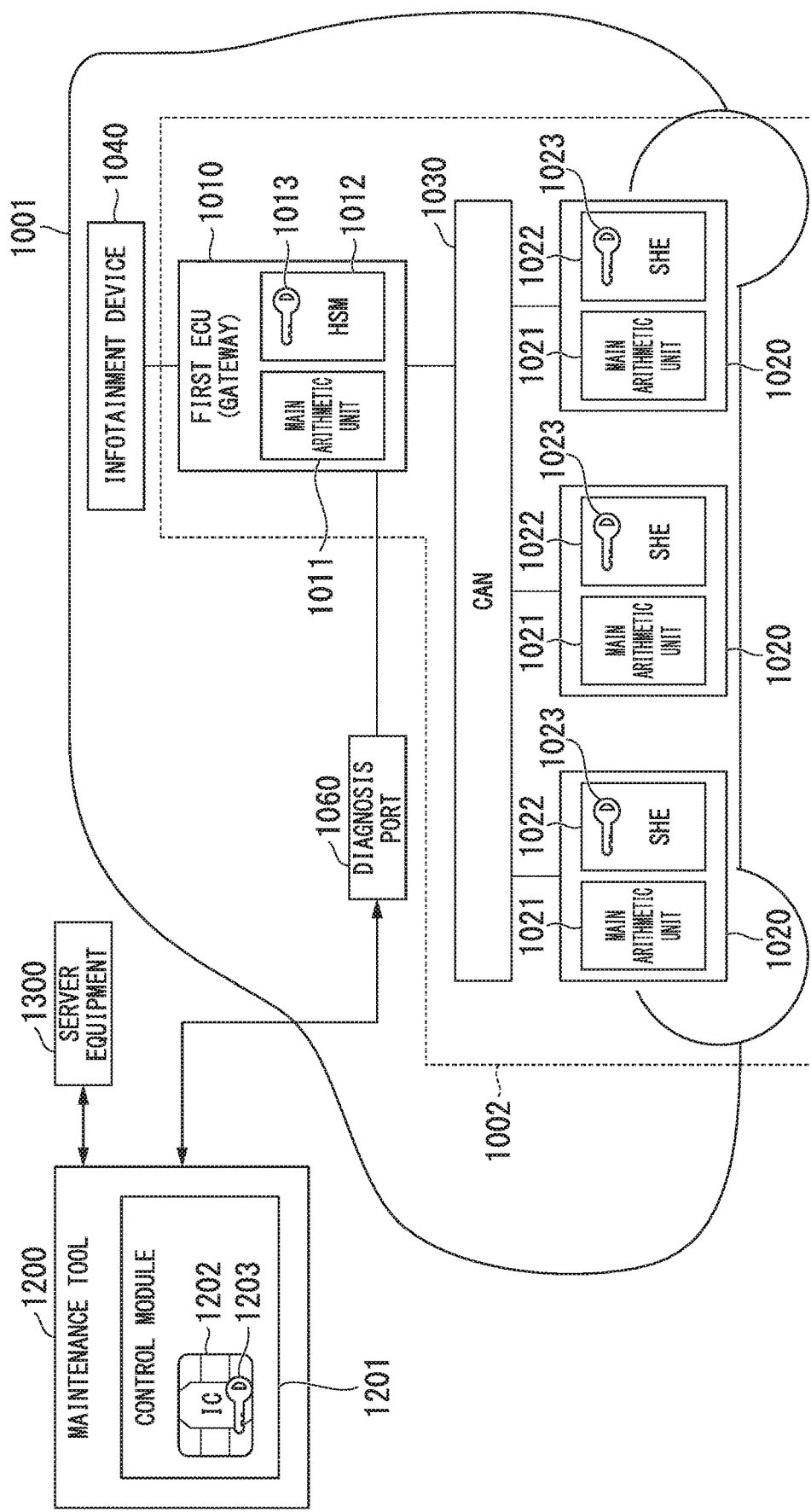
FIG. 12 is a block diagram showing an automobile according to the second embodiment of the present invention.

FIG. 12 is a block diagram showing a configuration example of the automobile 1001 according to the second embodiment of the present invention. The present embodiment refers to an example in which data of updated programs are applied to ECUs (Electronic Control Units) mounted on the automobile 1001.

Configuration Example 2 of Automobile

In FIG. 12, parts identical to those shown in FIG. 1 are denoted using the same reference signs; hence, descriptions thereof will be omitted here. In the automobile 1001 of Configuration Example 2 shown in FIG. 12, a maintenance tool 1200 is connectible to the diagnosis port 1060. The first ECU 1010 exchanges data with the maintenance tool 1200, which is connected to the diagnosis port 1060, via the diagnosis port 1060. In this connection, the maintenance tool 1200 may have a conventional function as a diagnosis terminal connectible to an OBD port.

The maintenance tool 1200 includes a control module 1201. The control module 1201 has an IC (Integrated Circuit) chip 1202. The IC chip 1202 has a key storage media 1203 configured to store keys. The IC chip 1202 is tamper resistance. The IC chip 1202 is an example of secure elements. The IC chip 1202 is one type of computer, which can achieve desired functions according to computer programs.

The server equipment 1300 transmits or receives data with the maintenance tool 1200 through communication lines. For example, it is possible to connect the server equipment 1300 and the maintenance tool 1200 together through a private line such as VPN so that they can receive or transmit data through a private line.

The server equipment 1300 delivers ECU codes applied to ECUs to the automobile 1001 by means of the maintenance tool 200. Herein, ECU codes may exemplify data applied to ECUs. In addition, ECU codes may be computer programs such as updated programs to be installed in ECUs. Alternatively, ECU codes may be setting data such as setting values of parameters to be set to ECUs. The server equipment 1300 transmits ECU codes attached with electronic signatures to the automobile 1001 via the maintenance tool 1200. The server equipment 1300 serves as a data delivering apparatus.

Management Method (Example 3)

Figure 13:
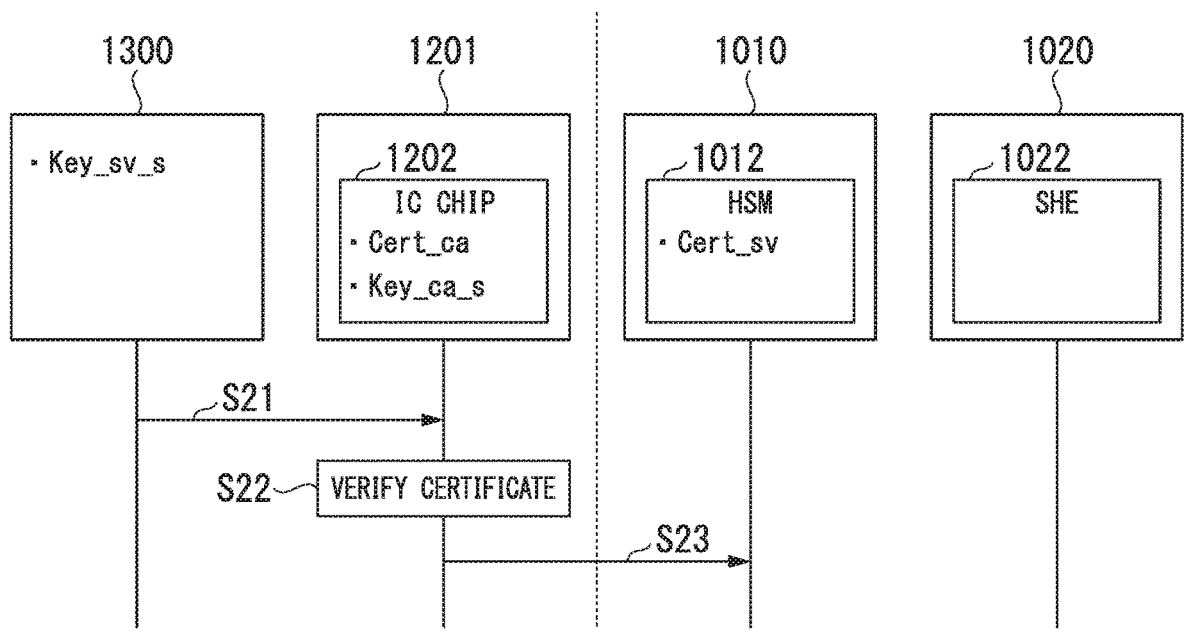
FIG. 13 is a sequence chart of a management method (Example 3) according to the second embodiment.

Next, the management method of Example 3 will be described with reference to FIGS. 13 and 14. FIG. 13 is a sequence chart showing the management method of Example 3 according to the present embodiment. According to the management method of Example 3, the IC chip 1202 possesses the certification-authority public key certificate Cert_ca and the certification-authority secret key Key_ca_s. The key storage media 1203 of the IC chip 1202 stores the certification-authority public key certificate Cert_ca and the certification-authority secret key Key_ca_s. Herein, both the certification-authority public key certificate Cert_ca and the certification-authority secret key Key_ca_s are safely stored on the IC chip 1202 when manufactured.

First, the procedure of delivering the server public key certificate Cert_sv according to the management method of Example 3 will be described with reference to FIG. 13.

(Step S21)

The server equipment 1300 possesses the server secret key Key_sv_s. The server equipment 1300 transmits to the maintenance tool 1200 the server public key certificate Cert_sv relative to the server secret key Key_sv_s. The server public key certificate Cert_sv is issued by a certification authority. The certification-authority public key certificate Cert_ca is a public key certificate of a certification authority issuing the server public key certificate Cert_sv. That is, the server public key certificate Cert_sv is generated using a secret key of a certification authority relative to the certification-authority public key certificate Cert_ca.

(Step S22)

In the maintenance tool 1200, the control module 1201 receives the server public key certificate Cert_sv from the server equipment 1300 and then forwards it to the IC chip 1202. The IC chip 1202 verifies the validity of the server public key certificate Cert_sv by use of the certification-authority public key certificate Cert_ca.

(Step S23)

The control module 1201 sends the server public key certificate Cert_sv, which is successfully verified in validity by the IC chip 1202, to the first ECU 1010 via the diagnosis port 1060 of the automobile 1001. The first ECU 1010 receives the server public key certificate Cert_sv from the control module 1201 and then sends it to the HSM 1012. The key storage media 1013 of the HSM 1012 receives and stores the server public key certificate Cert_sv from the control module 1201.

On the other hand, the control module 1201 discards the server public key certificate Cert_sv, which the IC chip 1202 fails to verify. Therefore, it is possible to prevent the server public key certificate Cert_sv, for which verification by the IC chip 1202 failed, from being transferred to the automobile 1001. In addition, it is possible for the control module 1201 to carry out an error process determined in advance with respect to the server public key certificate Cert_sv, for which verification failed.

According to the management method of Example 3, the IC chip 1202 of the control module 1201, which is installed in the control module 1201 of the maintenance tool 1200, possesses the certification-authority public key certificate Cert_ca, and therefore the IC chip 1202 verifies the validity of the server public key certificate by use of the certification-authority public key certificate Cert_ca. The IC chip 1202 possesses the certification-authority public key certificate Cert_ca having high security because the IC chip 1202 is tamper resistant. Accordingly, it is possible for the IC chip 1202 to produce a highly reliable result in verifying the validity of the server public key certificate Cert_sv.

Next, the procedure of delivering ECU codes according to the management method of Example 3 will be described with reference to FIG. 14. FIG. 14 shows an example of the procedure of delivering ECU codes applied to the second ECU 1020, however, it is possible to apply a similar procedure to ECU codes applied to the first ECU 1010 although the destination of applying ECU codes is changed to the first ECU 1010.

Procedure of Delivering ECU Codes (Example 3)

Figure 14:
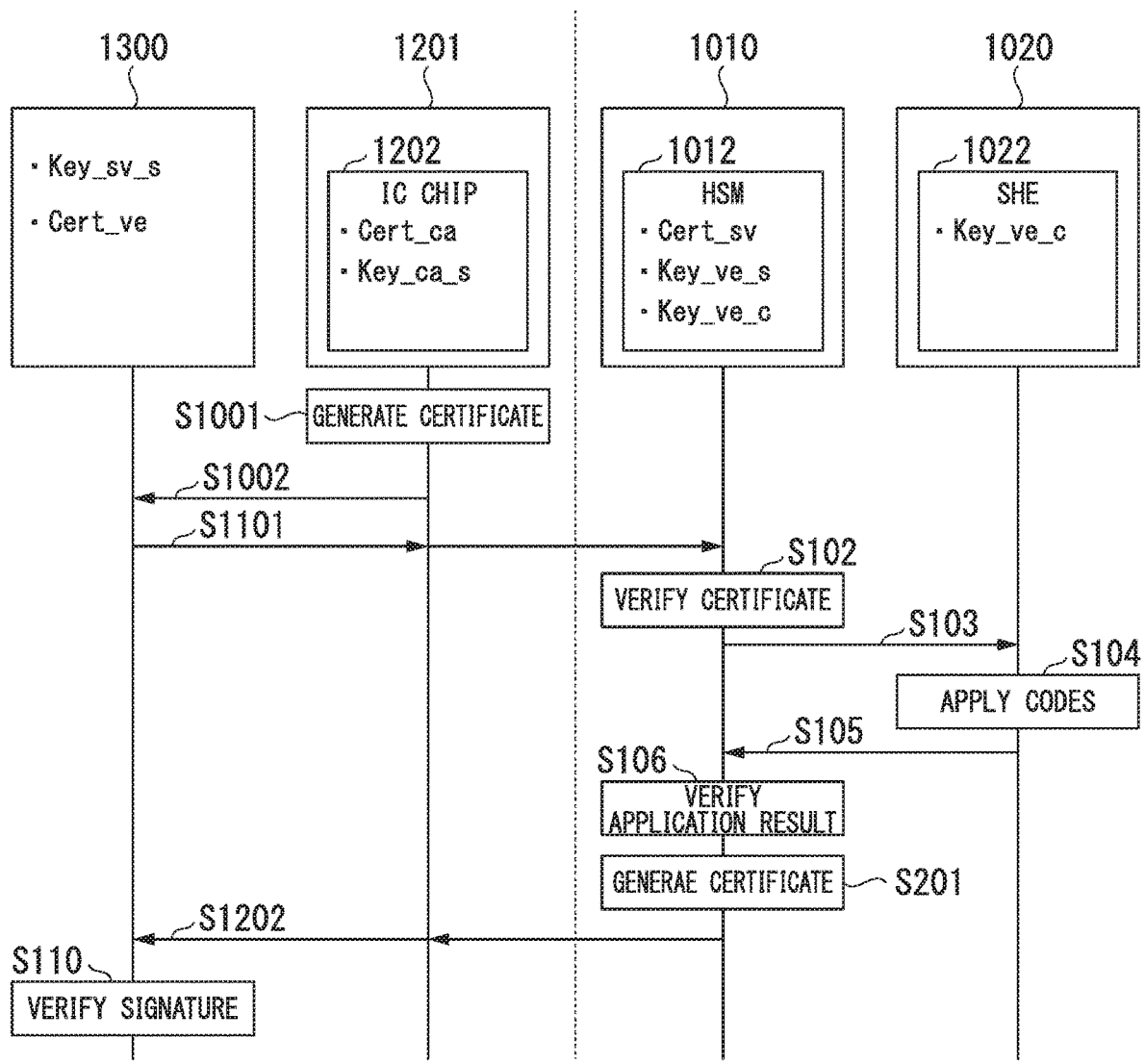
FIG. 14 is a sequence chart showing a procedure of delivering ECU codes (Example 3) according to the second embodiment.

FIG. 14 is a sequence chart showing the procedure of delivering ECU codes according to Example 3. The procedure of delivering ECU codes according to Example 3 will be described with reference to FIG. 14. In FIG. 14, the server equipment 1300 possesses the server secret key Key_sv_s and the automobile public key certificate Cert_ve. In the maintenance tool 1200, the IC chip 1202 of the control module 1201 possesses the certification-authority public key certificate Cert_ca and the certification-authority secret key Key_ca_s. The key storage media 1203 of the IC chip 1202 stores the certification-authority public key certificate Cert_ca and the certification-authority secret key Key_ca_s.

In the automobile 1001, the HSM 1012 of the first ECU 1010 possesses the server public key certificate Cert_sv, the automobile secret key Key_ve_s, and the automobile common key Key_ve_c. The key storage media 1013 of the HSM 1012 stores the server public key certificate Cert_sv, the automobile secret key Key_ve_s, and the automobile common key Key_ve_c. The key storage media 1013 of the HSM 1012 stores the server public key certificate Cert_sv, the validity of which has been successfully verified according to the foregoing procedure of FIG. 13.

The SHE 1022 of the second ECU 1020 possesses the automobile common key Key_Ve_c.

The key storage media 1023 of the SHE 1022 stores the automobile common key Key_ve_c. Both the HSM 1012 of the first ECU 1010 and the SHE 1022 of the second ECU 1020 possess the same automobile common key Key_ve_c.

(Step S1001)

In the maintenance tool 1200, the IC chip 1202 of the control module 1201 generates a public key certificate (i.e. the automobile public key certificate Cert_ve) for a public key relative to the automobile secret key Key_ve_s of the automobile 1001, which the maintenance tool 1200 is connected to, by use of the certification-authority secret key Key_ca_s. The public key relative to the automobile secret key Key_ve_s of the automobile 1001 is supplied to the control module 1201 of the maintenance tool 1200 from the first ECU 1010 via the diagnosis port 1060.

(Step S1002)

The control module 1201 transmits to the server equipment 1300 the automobile public key certificate Cert_ve generated by the IC chip 1202. The server equipment 1300 receives and stores the automobile public key certificate Cert_ve from the control module 1201 of the maintenance tool 1200.

(Step S1101)

The server equipment 1300 transmits the ECU code attached with an electronic signature to the maintenance tool 1200. The ECU code attached with an electronic signature is generated using the server secret key Key_sv_s. The control module 1201 of the maintenance tool 1200 receives the ECU code attached with an electronic signature from the server equipment 1300 and then sends it to the first ECU 1010 via the diagnosis port 1060.

(Step S102)

The first ECU 1010 receives the ECU code attached with an electronic signature from the control module 1201 via the diagnosis port 1060 and then sends it to the HSM 1012. The HSM 1012 verifies the electronic signature attached to the ECU code by use of the server public key certificate Cert_sv.

Next, a series of steps S103 to S106 are executed. A series of step S103 to S106 are similar to those according to the foregoing procedure of delivering ECU codes of Example 1-a. Following the step S106, the step S201 will be executed. The step S201 is identical to the step S201 of the procedure of delivering ECU codes of Example 1-b shown in FIG. 4. Following the step S201, step S1202 will be executed.

(Step S1202)

The first ECU 1010 transmits to the control module 1201 of the maintenance tool 1200 via the diagnosis port 1060 the application result information attached with an electronic signature generated by the HSM 1012. The control module 1201 receives the application result information attached with an electronic signature from the first ECU 1010 via the diagnosis port 1060 and then transmits it to the server equipment 1300.

Next, the step S110 will be executed. The step S110 is identical to the step S110 of the procedure of delivering ECU codes of Example 1-a shown in FIG. 3.

According to the procedure of delivering ECU codes of Example 3, the HSM 1012 of the first ECU 1010 receives the ECU code attached with an electronic signature from the server equipment 1300 and then verifies the electronic signature using the server public key certificate Cert_sv. In the maintenance tool 1200, the IC chip 1202 of the control module 1201 has already verified the validity of the server public key certificate Cert_sv by use of the certification-authority public key certificate Cert_ca. Therefore, it is possible for the HSM 1012 of the first ECU 1010 to produce a highly reliably result in verifying the electronic signature attached to the ECU code. Thus, it is possible to improve the reliability of verifying the validity of ECU codes applied to ECUs.

The IC chip 1202, which is installed in the maintenance tool 1200, serves as a private certification authority since it possesses the certification-authority secret key Key_ca_s. Thus, it is possible for the maintenance tool 1200 to generate the automobile public key certificate Cert_ve of the automobile 1001.

According to the foregoing embodiment, each secure element possesses the certification-authority public key certificate Cert_ca. According to the foregoing embodiment, the management method of Example 1 uses the SIM 1052 as a secure element to possess the certification-authority public key certificate Cert_ca; the management method of Example 2 uses the HSM 1012 as a secure element to possess the certification-authority public key certificate Cert_ca; and the management method of Example 3 uses the IC chip 1202 as a secure element to possess the certification-authority public key certificate Cert_ca. Each of the secure elements verifies the validity of the server public key certificate Cert_sv by use of the certification-authority public key certificate Cert_ca. The server public key certificate Cert_sv, which is successfully verified by each secure element, is used to verify an electronic signature attached to the ECU code delivered by the server equipment 1300. Accordingly, it is possible to improve the reliability of verifying the validity of data attached with electronic signatures by use of public key certificates in the automobile when data of updated programs, which are applied to ECUs of the onboard control system of the automobile, are attached with electronic signatures and delivered to the automobile.

Generally, the server equipment 1300 periodically changes its public key certificate (i.e. server public key certificate Cert_sv) by every several years. According to the foregoing embodiment, the secure element verifies the validity of a new server public key certificate Cert_sv by use of the certification-authority public key certificate Cert_ca; hence, it is possible to improve the reliability of the exchanged server public key certificate Cert_sv.

In addition, the certification-authority public key certificate Cert_ca is stored on the secure element having tamper resistance; hence, it is possible to prevent any attacks against the certification-authority public key certificate Cert_ca stored on the secure element. That is, the secure element verifies the validity of the server public key certificate Cert_sv, and therefore it is possible to improve the reliability of verifying the validity of the server public key certificate Cert_sv.

According to the foregoing embodiment, the secure element serves as a private certification authority because it possesses the certification-authority secret key Key_ca_s. Due to the tamper resistance of the secure element, it is possible to prevent any attacks against the certification-authority secret key Key_ca_s stored on the secure element. The secure element generates the automobile public key certificate Cert_ve with respect to the automobile 1001 including the secure element or the automobile 1001 which the secure element is connected to via the diagnosis port 1060. Thus, it is possible to generate the automobile public key certificate Cert_ve efficiently while improving its reliability.

According to the foregoing embodiment, the secure element possesses the automobile secret key Key_ve_s. Due to the tamper resistance of the secure element, it is possible to prevent any attacks against the automobile secret key Key_ve_s stored on the secure element. The secure element generates an electronic signature attached to the application result information by use of the automobile secret key Key_ve_s. Thus, it is possible to improve the reliability of the application result information attached with an electronic signature.

The foregoing embodiment can be applied to onboard computers such as ECUs mounted on automobiles. According to the foregoing embodiment, it is possible to produce an effect of improving the reliability of verifying the correctness of data applied to onboard computers such as ECUs.

Heretofore, various embodiments of the present invention has been described in detail with reference to the drawings, however, concrete configurations are not necessarily limited to the foregoing embodiments; hence, the present invention may embrace any changes of design without departing from the subject matter of the invention.

In the foregoing embodiments, for example, it is possible to use SIM or eSIM for a secure element. Herein, eSIM is one type of SIM having tamper resistance. In addition, it is possible to use an IC chip having tamper resistance for a secure element. Moreover, it is possible to use an encryption processing chip having tamper resistance for a secure element. As encryption processing chips having tamper resistance, for example, various types of encryption processing chips, which may be called HSM, TPM (Trusted Platform Module), TPMf, TPMt and SHE, are known.

The foregoing embodiments refer to an automobile as an example of vehicles, however, they can be applied to other types of vehicles, other than automobiles, such as motorcycles having engines and railroad vehicles.

It is possible to record computer programs, which may achieve the functions of devices installed in an automobile or a maintenance tool, on computer-readable storage media, and therefore it is possible to load programs stored on storage media into a computer system, thus executing programs. Herein, the term "computer system" may embrace OS or hardware such as peripheral devices.

In addition, the term "computer-readable storage media." may refer to flexible disks, magneto-optic disks, ROM, rewritable non-volatile memory such as flash memory, portable disks such as DVD (Digital Versatile Disk), and storage units such as hard disks embedded in computer systems.

The term "computer-readable storage media" may embrace any measures for holding programs for a certain period of time such as volatile memory (e.g. DRAM (Dynamic Random Access Memory)) inside computer systems serving as servers and clients implementing programs transmitted through networks such as the Internet or communication lines such as telephone lines.

The aforementioned programs can be transmitted to one computer system from another computer system, which stores programs on storage units or the like, through transmission media or via transmission waves propagating through transmission media. Herein, the term "transmission media" for transmitting programs may refer to any media having functions to transmit information, e.g. networks such as the Internet or communication lines such as telephone lines.

The aforementioned programs may achieve part of the foregoing functions.

Alternatively, the aforementioned programs may be differential files (or differential programs) which are combined with preinstalled programs of computer system to achieve the foregoing functions.

REFERENCE SIGNS LIST 1001 automobile
1002 onboard computer system
1010 first ECU
1011, 1021 main arithmetic unit
1012 HSM
1013, 1023, 1053, 1203 key storage media
1020 second ECU
1022 SHE
1030 CAN
1040 infotainment device
1050 TCU
1051 communication module
1052 SIM
1060 diagnosis port
1065 diagnosis terminal
1200 maintenance tool
1201 control module
1202 IC chip
1300 server equipment

The invention claimed is:

1. An onboard computer system, comprising:
a first onboard computer configured to store a first public key certificate of a data delivering apparatus in connection with a first secure element configured to store a second public key certificate associated with a second secret key used for generating the first public key certificate; and
a second onboard computer connected to the first onboard computer through a communication network,
wherein the first secure element is configured to verify the first public key certificate by use of the second public key certificate,
wherein the first onboard computer comprises an encryption processor configured to verify a first electronic signature attached to data delivered from the data delivering apparatus by use of the first public key certificate which is successfully verified by the first secure element, and
wherein the first onboard computer or the second onboard computer is configured to apply the data attached with the first electronic signature, which is successfully verified by the encryption processor.

2. The onboard computer system according to claim 1, wherein the first secure element is configured to store a third secret key and to generate a third electronic signature for application result information representing an applied result of the data by use of the third secret key, and
wherein the onboard computer system transmits the application result information attached with the third electronic signature to the data delivering apparatus.

3. The onboard computer system according to claim 2,
wherein the first secure element is configured to store a second secret key and to generate a third public key certificate associated with the third secret key by use of the second secret key, and
wherein the onboard computer system transmits the third public key certificate to the data delivering apparatus.

4. The onboard computer system according to claim 1, further comprising:
a second secure element configured to store a third secret key,
wherein the second secure element is configured to generate a third electronic signature attached to application result information representing an applied result of the data by use of the third secret key, and
wherein the onboard computer system transmits the application result information attached with the third electronic signature to the data delivering apparatus.

5. The onboard computer system according to claim 4,
wherein the second secure element is configured to store a second secret key and and to generate a third public key certificate associated with the third secret key by use of the second secret key, and
wherein the onboard computer system transmits the third public key certificate to the data delivering apparatus.

6. The onboard computer system according to claim 1,
wherein the first secure element is installed in a communication module mounted on a vehicle.

7. The onboard computer system according to claim 1,
wherein the first secure element is installed in the first onboard computer.

8. The onboard computer system according to claim 4,
wherein the second secure element is installed in the first onboard computer.

9. The onboard computer system according to claim 4,
wherein the second secure element is installed in a communication module mounted on a vehicle.

10. The onboard computer system according to claim 1,
wherein the first onboard computer sends the data attached with the first electronic signature, which is successfully verified by the encryption processor, to the second onboard computer,
wherein the second onboard computer receives and applies the data from the first onboard computer, and
wherein the first onboard computer and the second onboard computer are configured to store a same common key and thereby to verify a validity of applying the data by use of the common key.

11. The onboard computer system according to claim 1,
wherein the secure element is installed in a device outside a vehicle so as to receive or transmit the data with the first onboard computer, by use of the second public key certificate.

12. A vehicle, comprising:
the onboard computer system according to claim 1, which is installed in a vehicle.

13. A management method adapted to an onboard computer system comprising a first onboard computer configured to store a first public key certificate of a data delivering apparatus, and a second onboard computer connected to the first onboard computer through a communication network in connection with a secure element configured to store a second public key certificate associated with a second secret key used to generate the first public key certificate, said management method comprising:
public key certificate verifying for the secure element by verifying the first public key certificate by use of the second public key certificate;
electronic signature verifying for the first onboard computer by verifying a first electronic signature attached to data delivered from the data delivering apparatus by use of the first public key certificate which is successfully verified by the secure element; and
data applying for applying the first onboard computer or the second onboard computer by applying the data attached with the first electronic signature successfully verified in the electronic signature verifying.

14. The management method adapted to an onboard computer system according to claim 13,
wherein the secure element is installed in a device outside a vehicle so as to receive or transmit the data with the first onboard computer by use of the second public key certificate.

15. A non-transitory computer-readable storage medium configured to store a computer program causing an onboard computer system to implement the management method according to claim 13.

16. A non-transitory computer-readable storage medium configured to store a computer program causing an onboard computer system to implement the management method according to claim 14.

* * * * *

UNITED STATES PATENT AND TRADEMARK OFFICE
CERTIFICATE OF CORRECTION

PATENT NO. : 10,931,459 B2
APPLICATION NO. : 16/064232
DATED : February 23, 2021
INVENTOR(S) : Keisuke Takemori et al.

Page 1 of 1

It is certified that error appears in the above-identified patent and that said Letters Patent is hereby corrected as shown below:

On the Title Page

Other Publications, page 2, Column 2, Line 15, "1688172.6" should read -- 16881726.0 --.

Other Publications, page 2, Column 2, Line 51, "June 12, 2009" should read -- June 12, 2019 --.

In the Claims

In Column 25, Line 21 (Claim 5), "key and and" should read -- key and --.

In Column 26, Line 1 (Claim 10), "and thereby to" should read -- and to --.

In Column 26, Line 28 (Claim 13), "for applying the" should read -- for the --.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*